(12) United States Patent
Kawara

(10) Patent No.: US 7,570,374 B2
(45) Date of Patent: Aug. 4, 2009

(54) DOCUMENT GENERATION APPARATUS AND FILE CONVERSION SYSTEM

(75) Inventor: Satoshi Kawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 862 days.

(21) Appl. No.: 11/131,274

(22) Filed: May 18, 2005

(65) Prior Publication Data
US 2005/0270553 A1     Dec. 8, 2005

(30) Foreign Application Priority Data
May 18, 2004   (JP) ............... 2004-148302

(51) Int. Cl.
*G06F 15/00* (2006.01)
*G06F 17/00* (2006.01)
(52) U.S. Cl. .................... 358/1.11; 715/205
(58) Field of Classification Search ............... 358/1.11, 358/1.15, 1.13, 1.16, 1.12; 715/205, 227, 715/262, 269, 274; 705/26; 271/262, 263; 400/61, 70, 76
See application file for complete search history.

(56) References Cited

U.S. PATENT DOCUMENTS

| | | | | |
|---|---|---|---|---|
| 5,528,742 A | * | 6/1996 | Moore et al. ............... | 715/205 |
| 5,815,160 A | * | 9/1998 | Kikuchi et al. ............. | 345/661 |
| 6,622,239 B1 | * | 9/2003 | Wong et al. ................ | 712/227 |
| 6,862,103 B1 | | 3/2005 | Miura | |
| 6,954,898 B1 | * | 10/2005 | Nakai et al. ................ | 715/262 |
| 2003/0174135 A1 | * | 9/2003 | Gyllenskog et al. ......... | 345/471 |

FOREIGN PATENT DOCUMENTS

| | | |
|---|---|---|
| JP | 07-141337 | 6/1995 |
| JP | 11-353310 | 12/1999 |
| JP | 2000284937 | 10/2000 |
| JP | 2001-092814 | 4/2001 |

* cited by examiner

*Primary Examiner*—Saeid Ebrahimi Dehkordy
(74) *Attorney, Agent, or Firm*—Fitzpatrick, Cella, Harper & Scinto

(57) ABSTRACT

A document generation apparatus has a comparator that compares the type of language of original document data and the type of language provided at a reproduction terminal that reproduces the original document data, and a generator that generates document data with font based on the original document that does not include a character font when results of a comparison performed by the comparator indicate that both types of languages match, and generates document data with font based on the original document that does include a character font used in the original document data when the results of the comparison performed by the comparator indicate that both types of language do not match.

7 Claims, 24 Drawing Sheets

FIG. 3
PRIOR ART
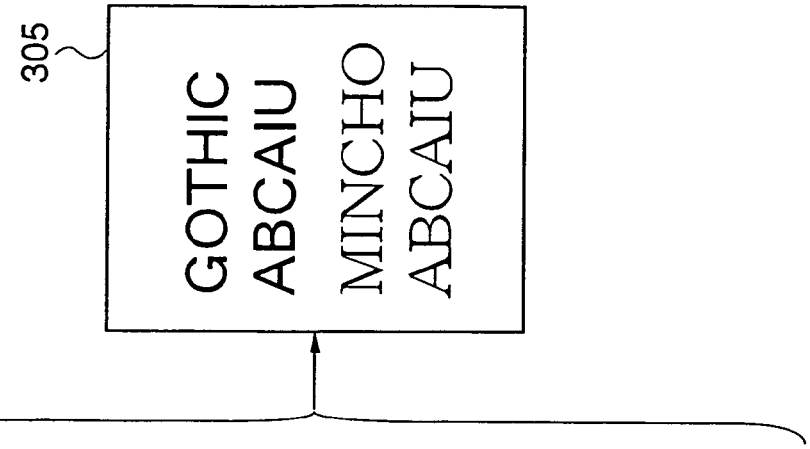
301 — · CHARACTER CODE
| CHARACTER | A | B | C | A | I | U |
|---|---|---|---|---|---|---|
| Shift JIS | 0x41 | 0x42 | 0x43 | 0xB1 | 0xB2 | 0xB3 |
| UNICODE | 0x0041 | 0x0042 | 0x0043 | 0x30A2 | 0x30A4 | 0x30A6 |
302 — · FONT ATTRIBUTES
FACE NAME : "GOTHIC"   BOLD : SPECIFIED   POINT : 18
FACE NAME : "MINCHO"   BOLD : SPECIFIED   POINT : 18
303 — · RENDERING ATTRIBUTES
POSITION, COLOR, CLIP
304 — · FONT FORM INFORMATION
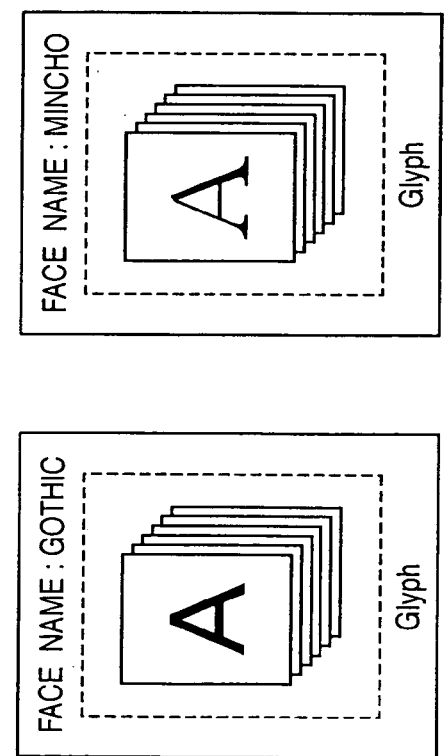

FIG. 10

| FILE ID | FILE NAME |
|---|---|
| 1 | Sample 1.doc |
| 2 | Sample 2.doc |
| 3 | Sample 3.doc |
| ⋮ | ⋮ |

FIG. 11

| Language ID | FILE ID |
|---|---|
| 1044 | 1 |
| 1044 | 2 |
| ⋮ | ⋮ |

FIG. 13

| FONT FACE NAME | PROCESSING METHOD |
|---|---|
| MINCHO | FONT EMBEDDING |
| GOTHIC | FONT EMBEDDING |
| TimesNewRoman | BITMAP |
| Century | FONT SUBSTITUTION |
| ⋮ | ⋮ |

FIG. 18

| COUNTRY | Language ID |
|---|---|
| JAPAN | 1041 |
| KOREA | 1042 |
| CHINA | 1028 |
| USA | 1033 |
| ⋮ | ⋮ |

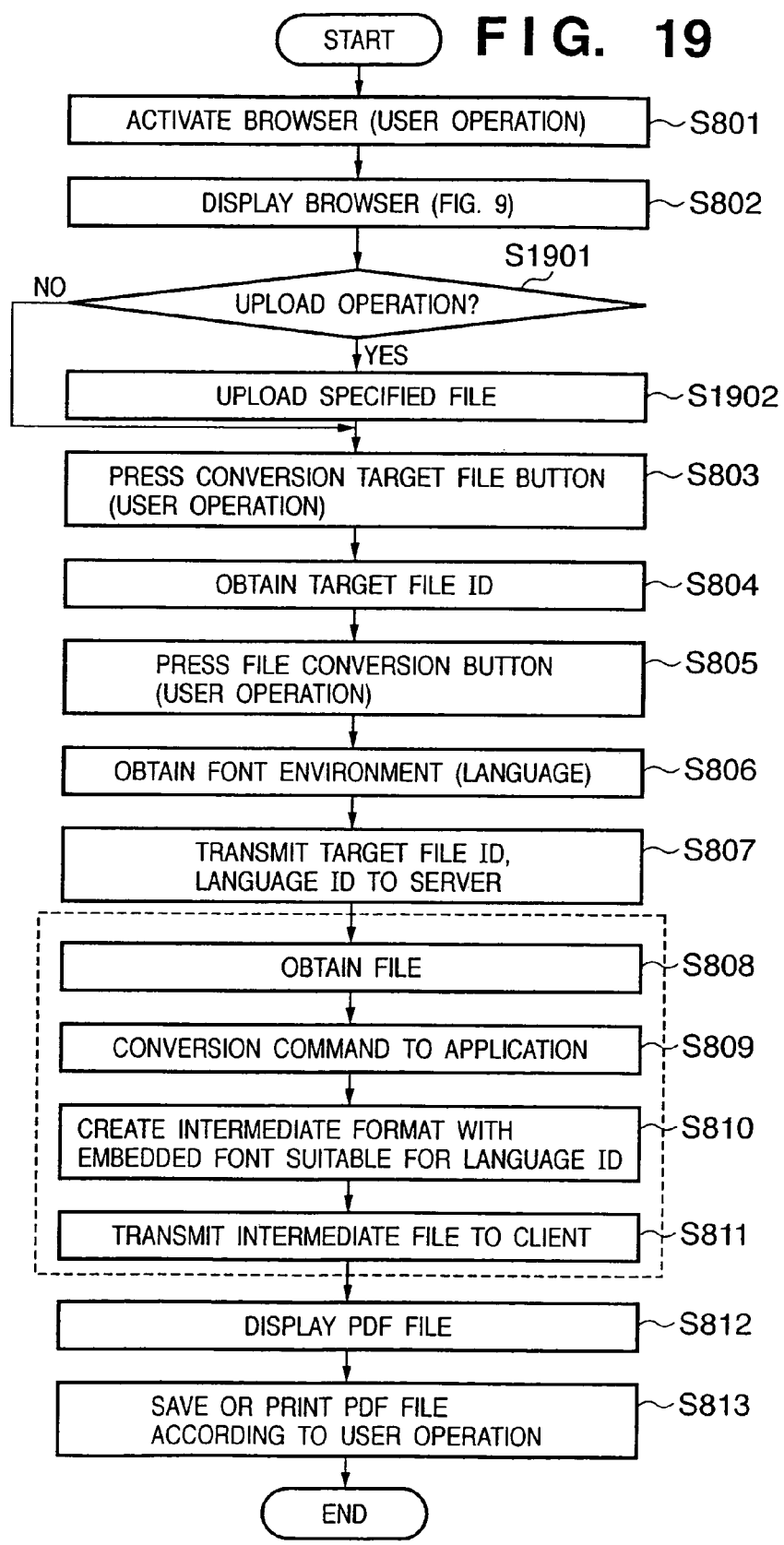

FIG. 22

| TOP-LEVEL DOMAIN NAME | Language ID |
|---|---|
| jp | 1041 |
| kr | 1042 |
| ........ | ........ |

2201

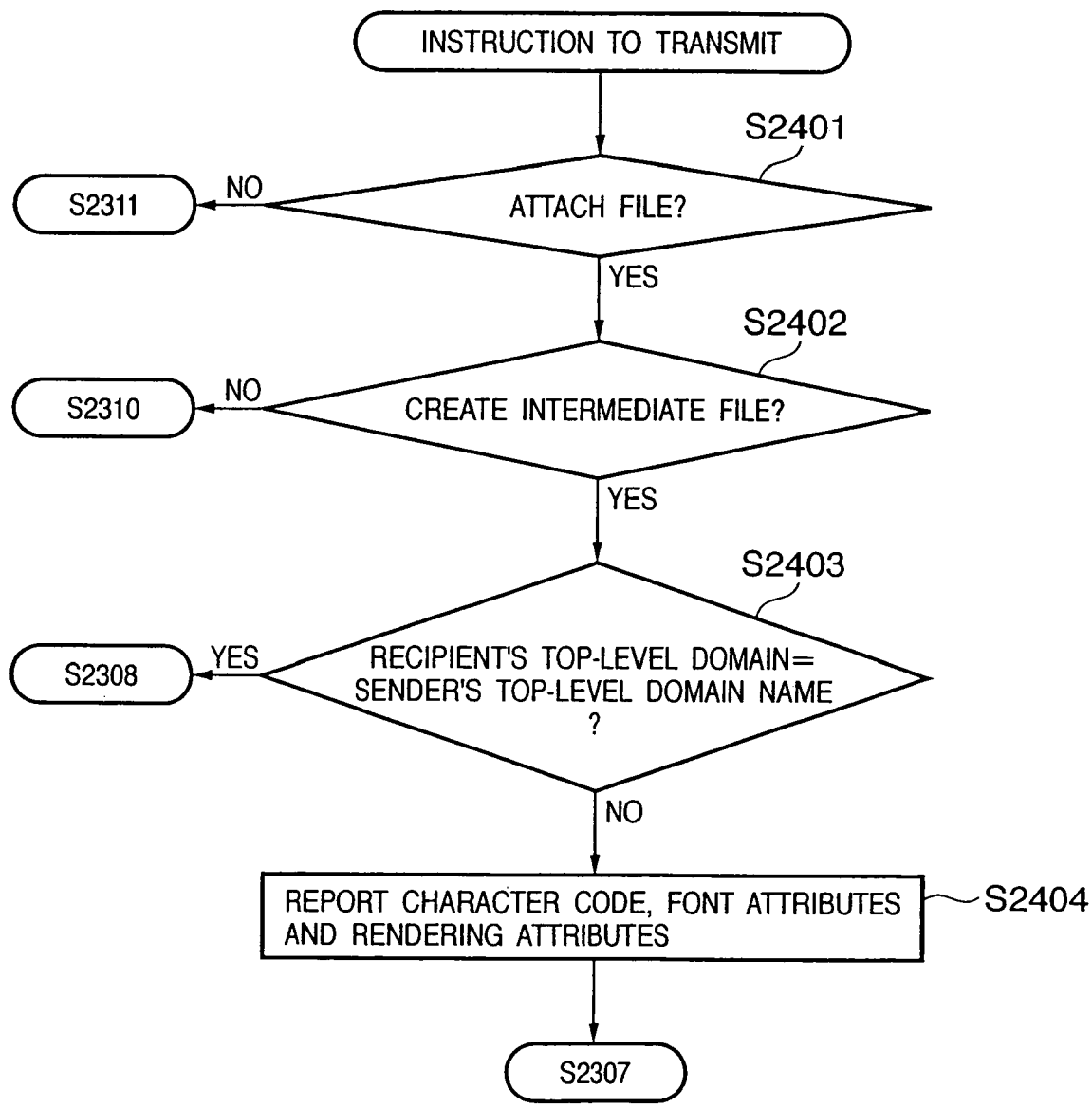

DOCUMENT GENERATION APPARATUS AND FILE CONVERSION SYSTEM

FIELD OF THE INVENTION

This invention relates to a document generation apparatus for creating a document file capable of carrying fonts such as PDF, for example, and more particularly, to a file conversion system installed in a client server system.

BACKGROUND OF THE INVENTION

In order to further an understanding of the present invention, a description is given first of the conventional technology for the Web. Amid the rapid development of the Internet and the proliferation of Web servers, "Web-based" business processing is being propelled forward. A Web server can support HTTP (Hyper Text Transfer Protocol) and FTP (File Transfer Protocol) and the like, specify a computer or the like connected to a network, and, in response to a request, transmit, to a client on the network, a document data file or the like specified by a URL (Uniform Resource Locator) and written in HTML (Hyper Text Markup Language). A client computer, such as a personal computer or the like, then executes an application program called a Web browser having the ability to display the data (the HTML document) written in HTML and displays the HTML document received from the Web server. Usually, the Web browser (hereinafter called simply a "browser") is equipped with the ability not only simply to display the HTML document but also, in accordance with the HTML description, to input data on a display screen and to send that input data back to the Web server. It should be noted that "Web-based" refers to the ability to specify a URL from the client and to exchange data with the server.

In a Web-based business system, a browser that can display and input data is installed in the client computer, and an operator executes such business processes as display and input of the browser as a user interface. In this case, information input from the client browser is accepted by the Web server, the Web server or another server that is connected to the Web server processes the information, and information showing the result obtained is then transmitted back to the client browser. At the client, operations such as displaying the information received from the server and the like are carried out as necessary. Thus, business is conducted by a procedure like the foregoing, and the operator can obtain results (information).

As described above, when data such as a document or an image is transferred to the Web browser from the server, a file such as these data files and the like are placed in a particular directory (indicating a document route in HTTP terminology, hereinafter called a "directory") in the Web server file system that can be accessed from the client. If the client requests that file, the URL for that file is transferred to the client. At the client, if the URL is specified and an FTP or the like used, processing is carried out on the server and the desired file is transmitted to the client.

As one type of information processing by the server, a conversion from an application file created using an application program for creating documents, charts, images, figures and the like to an intermediate format file (an intermediate file) such as a PDF file or the like is known (for example, see Japanese Laid-Open Patent Publication No. 2000-284937). When the intermediate file obtained as a result of that conversion is reproduced, sometimes character rendering does not go as planned due to differences in the font environments of the client and the server. It should be noted that reproduction of the intermediate file means reproducing a document from an intermediate file by displaying or printing the document that comprises the content of the intermediate file. In addition, the font environment includes, in the operating system that manages the resources of the computer, the type of language managed as one resource and the types of font that can be used by the computer. The operating system language is English if, for example, the operating system is an English language version, or Japanese if the operating system is a Japanese language version. It is possible to switch languages depending on the operating system type, but even in that case, typically, a fixed language is specified.

The intermediate file contains rendering commands that describe the objects that form the document and the operands that indicate the positions, sizes and so forth of the objects. Broadly, the rendering commands can usually be divided into three main types, depending on the type of object: Rendering commands related to characters that output characters, rendering commands related to images that output bitmap images and the like, and rendering commands related to graphics that output such figures as lines, circles, squares and the like.

A description is now given of the rendering commands related to characters of Microsoft Corporation's Windows (registered trademark) operating system. FIG. 3 is a schematic diagram showing information required for character rendering. Although FIG. 3 shows but one example, generally, the character rendering commands require the following four types of font information as operands:

(1) Character Code 301:

Information that identifies the character. Uses character codes in accordance with previously determined code systems such as ASCII, ShiftJIS, Unicode, etc.

(2) Font Attributes 302:

Includes such information as font face names suitable for character rendering, whether there is an italic/bold instruction indicating modification of a glyph, the number of points indicating the size of the characters, and so forth.

(3) Rendering Attributes 303:

Includes information indicting the rendering position of the character, its color, clip condition, etc.

(4) Font Form Information 304:

Includes information indicating the character rendering shape specified by such face names as Gothic, Mincho and the like. Has a glyph for each character. Two main types of font information formats, bitmap font and outline font, defining a variety of formats such as TrueType (registered trademark), OPENTYPE (registered trademark) and so forth.

Unless all of the foregoing information is in good order, character rendering will not take place as the user intends. Ordinarily, the character rendering data in the intermediate file includes character rendering commands using the three types of font information described above, that is, character code, font attributes and rendering attributes. Then, usually, when executing character rendering on a computer or the like, that is, when reproducing the intermediate file, based on the font face name included in the character rendering commands, the computer checks the font form information for the same font face name that the OS (Operating System) that manages the computer has, and renders the character.

However, the specified font form information is not always present in all computer environments (it can also be said to be a resource that is provided by the OS). In other words, it is also possible that the font form information present in the computer environment in which the user creates the intermediate file (called the intermediate file creation environment) is not present in the computer environment in which character rendering is carried out (called the character rendering execution environment). If the font desired by a user who has created application data does not exist in the computer environment in which character rendering is carried out, then three techniques conventionally are known for carrying out character rendering using the font that the user desires or in a font of a form close to the desired font, namely, font substitution, bitmap substitution and font embedding. The following is a description of each of these three techniques with reference to FIG. 4, which is a diagram showing rendering results in cases in which each of these techniques is used.

(1. Font Substitution)

Font substation is a method in which, in the character rendering execution environment, rendering is carried out using a different font that resembles the font attributes in the character rendering data (intermediate file). Common methods of designating the different font are a method that uses a conversion table in which the application that carries out the character rendering is predefined and a method that uses a conversion table in which the OS is predefined. During character rendering data creation, the normal character rendering commands (character code, font attributes, rendering attributes) are created, but because the largest data size font form information is not required, this method has the advantage that the character rendering data size is small. On the other hand, a drawback of this method is that, because a different font is used, there is a possibility that character rendering of a form completely different from that which the user desires may be carried out, as shown by character pattern 401 in FIG. 4. Where the font that corresponds to the desired character code does not exist in the character rendering execution environment, rendering in which the output is not recognizable as a character might be carried out. For example, ordinarily, a Japanese language font does not exist in the computer environments used in the United States and Europe. Accordingly, if an intermediate file is created under a typical Japanese-capable OS and that intermediate file is then reproduced in a typical U.S. or European character rendering execution environment, for example under an English-capable OS, the font that corresponds to the character code in the intermediate file creation environment does not exist in the character rendering execution environment, and as a result, rendering of an unidentifiable character is carried out.

(2. Bitmap Substitution)

Bitmap substitution is a method in which the character is converted into a bitmap at the time the character rendering data (intermediate file) is created, and the character rendering is converted into a bitmap rendering. To the ordinary observer, the output is the same as the character rendering desired by the user. However, because it is a bitmap, as shown by character pattern 402 in FIG. 4 the quality of the character may be adversely affected by the resolution of the bitmap during enlargement and reduction.

(3. Font Embedding)

Font embedding is a method in which, in addition to the character rendering commands (character code, font attributes, rendering attributes), font form information is embedded in the character rendering data (intermediate file) and the font form information used by the character rendering data is imported into the character rendering execution environment. The font form information embedded on the character rendering data, in the character rendering execution environment, is registered as a font provided by that environment, and the character rendering data is character rendered using that font. Accordingly, font embedding has the advantage of begin able to obtain the output desired by the user even if the font specified by the character rendering commands in the character rendering data does not exist in the character rendering execution environment. However, because the font form information is embedded in the character rendering data, the character rendering data size tends to grow large. This problem becomes particularly acute when embedding fonts with many character types, such as the Japanese language font.

Of the three techniques described above, (1) font substitution is a process conducted in the character rendering execution environment. By contrast, (2) bitmap substitution and (3) font embedding are processes conducted during character rendering data creation. In addition, which of these three techniques is used typically is determined by a user on the character rendering data creation side specifying the technique for each font on, for example a user interface (hereinafter "UI").

Of the three techniques described above, it is preferable to use (3) font embedding in order to render faithfully in the character rendering execution environment the font desired by the user on the character rendering data creation side. This is because (3) font embedding, as described above, registers the embedded font information in the character rendering execution environment prior to character rendering, and thus securely renders characters in a format desired by the user on the character rendering data creation side.

In order to render faithfully the font desired by the character rendering data creation side user in the character rendering execution environment, it is preferable to use font embedding in the character rendering data. However, a problem with embedding the font in the character rendering data is that the character rendering data size increases. That is, from the standpoint of data size, it can be said to be preferable to embed only the fonts that are used in the character rendering data and that moreover do not exist in the character rendering execution environment, without embedding the fonts that do exist in the character rendering execution environment. In order to accomplish that, it is necessary for the character rendering data creation side user to know in advance which fonts are contained in the character rendering execution environment. However, determining which fonts should be embedded from among the many existing types of fonts imposes a heavy burden on the user who creates character rendering data.

In addition, which of the three techniques described above to use is ordinarily determined for each font when converting, using, for example, a user interface (UI) of a program that executes the conversion. However, the very act of the user on the character rendering data creation side specifying which of the fonts should be embedded from among the many different types of fonts itself imposes a heavy burden on the creation side. This problem becomes particularly acute when the font environment in which the character rendering data is created and the font environment in which the character rendering is carried out are very different.

In addition, it can happen that, even after embedding a character font, when it comes time to execute character rendering, the font specified by the character rendering commands in the character rendering data does not exist in the character rendering execution environment. In a case such as this, the computer that reproduced the intermediate file carries out the (1) font substitution described above. However, as described above, due to font substitution, a character of a form different from that intended when the original data was created may sometimes be reproduced. Consequently, in order to reproduce the intermediate file faithfully and as intended in the character rendering execution environment, an ability to obtain the font environment of the computer that is to execute the character rendering and automatically determine the font to be embedded in the character rendering execution environment is desirable.

SUMMARY OF THE INVENTION

The present invention is conceived in light of the foregoing conventional examples, and has as its object to provide a document generation apparatus and file conversion system that can generate an intermediate file in which font embedding is optimized, without the need for an awareness of the user's own font environment.

In addition, the present invention has as its object to provide a document generation apparatus and file conversion system that, when generating the intermediate file from the original data, creates an intermediate file that can reproduce the original data faithfully without the user specifying the font environment on the terminal that reproduces the intermediate file.

In addition, the present invention has as its object to provide a document generation apparatus and file conversion system that, when generating an intermediate file transmitted as an attached file to an e-mail from the original data, creates an intermediate file that can reproduce the original data faithfully in the recipient font environment.

In addition, the present invention has as its object to provide a document generation apparatus and file conversion system that satisfies all the requirements of intermediate file readability, size restriction and operator operability.

The above-described objects of the present invention are achieved by a configuration like that of the following.

That is, the present invention provides a document generation apparatus that generates document data with font that can include a character font based on original document data, comprising:

a comparator that compares the type of language of the original document data and the type of language provided at a reproduction terminal that reproduces the original document data; and a generator that generates document data with font based on the original document that does not include a character font when results of a comparison performed by the comparator indicate that both types of languages match, and generates document data with font based on the original document that does include a character font used in the original document data when the results of the comparison performed by the comparator indicate that both types of language do not match.

Alternatively, the above-described objects of the present invention are achieved by a configuration like that of the following.

That is, the present invention provides a file conversion system that connects a server device and a client device, the client device comprising:

an acquisition unit that obtains a font environment of a reproduction client device that reproduces an intermediate file; and a font environment transmission unit that transmits a conversion request for converting an application file created using an application program to an intermediate file of a predetermined format as well as the font environment of the reproduction client device to the server device, the server device comprising:

a converter that converts the application file to an intermediate file based on the conversion request and the font environment received from the client device;

an embedding unit that carries out font embedding according to the font environment when converting to an intermediate file; and a file transmitter that transmits the intermediate file to the client device.

According to the present invention, the user can generate an intermediate file that optimizes font embedding automatically, without the need for an awareness of the font environment of the user.

In addition, because file conversion takes place on the server, an intermediate file that optimizes font embedding can be generated and provided to the client even for an application file that includes a font that does not exist on the client, provided that that font is on the server.

In addition, because the intermediate file is generated by the server, there is no need for the client to have a program for carrying out any special process. As a result, the client processing capability can be relatively limited, thus making it possible to provide a low-cost client device.

In addition, when generating an intermediate file from original data, it is possible to create an intermediate file that can reproduce the original data faithfully in the font environment of the terminal that reproduces the intermediate file, without the user having to specify the font environment for such reproduction terminal.

In addition, when generating an intermediate file transmitted as an attachment to e-mail from original data, an intermediate file can be generated that reproduces the original data faithfully in the recipient font environment.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram showing information required for character rendering and sample print results;

FIG. 10 is a diagram showing a sample database table used in embodiments of the present invention;

FIG. 11 is a diagram showing a sample client request table used in the first embodiment of the present invention;

FIG. 13 is a diagram showing a sample of a font setting table storing character rendering methods set on a UI at each font, in a conventional printing system;

FIG. 18 is a diagram showing a sample Language ID list table used in the third embodiment of the present invention;

FIG. 19 is a flow chart illustrating the flow of a series of processes performed by a network file conversion system according to a fourth embodiment of the present invention;

FIG. 22 is a diagram showing an example of a destination DB indicating a correspondence between domain name and Language ID in the fifth embodiment of the present invention;

FIG. 24 is a flow chart showing the flow of a series of processes performed by a network file conversion system according to a first variation of the fifth embodiment of the present invention.

DETAILED DESCRIPTION OF THE PREFERRED EMBODIMENT(S)

Preferred embodiments of the present invention will now be described in detail in accordance with the accompanying drawings.

First Embodiment

Figure 5:
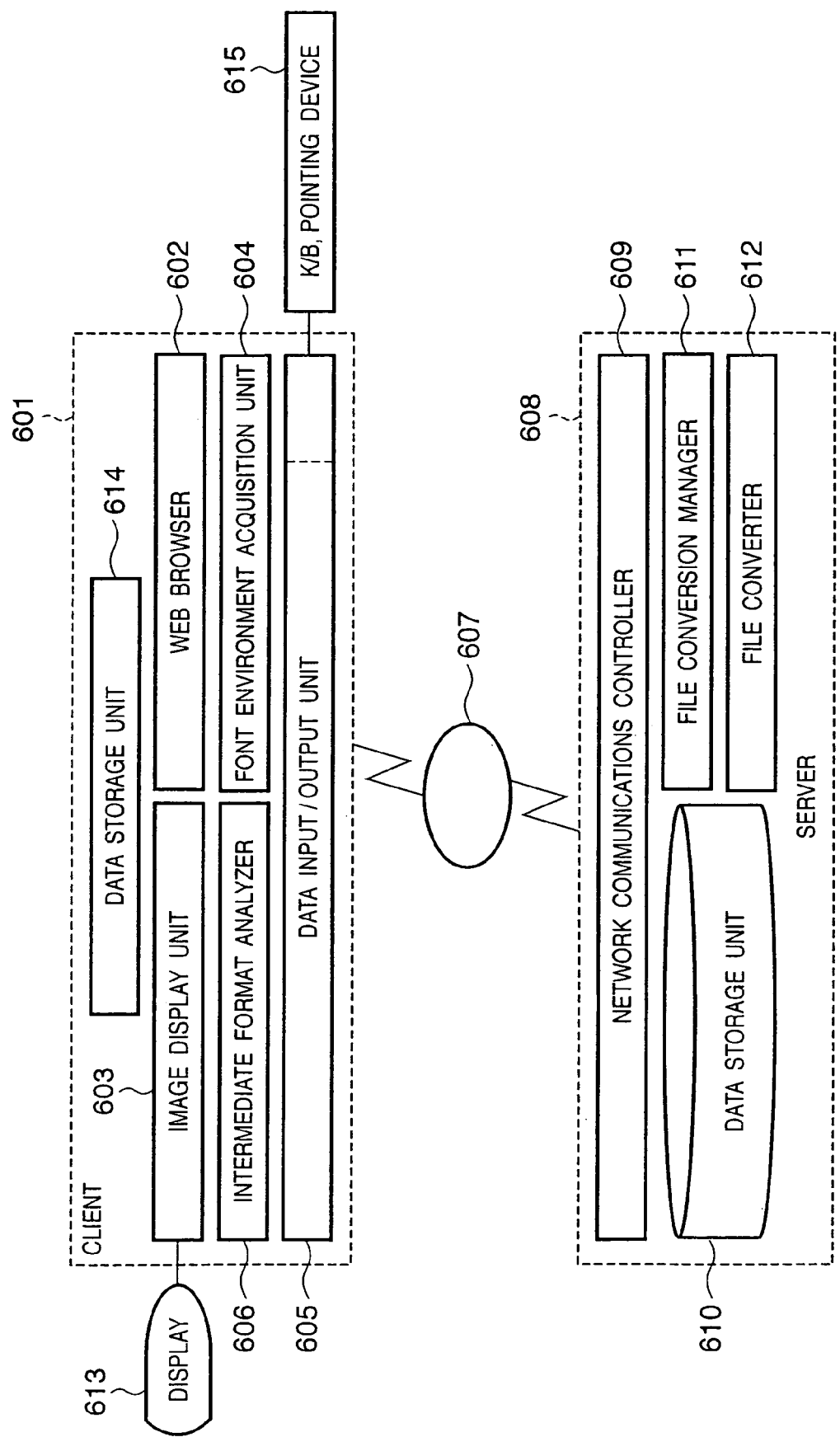
FIG. 5 is a software block diagram of a network system in an embodiment of the present invention.

FIG. 5 shows an outline of a first embodiment of the present invention. A client 601 automatically obtains a client 601 font environment, and moreover, specifies an application data file (the original data) on the server that a user wishes to convert to an intermediate format, and transmits that information to a server 608. At the server 608, the specified application data file is converted into an intermediate file (document data with font) in which a font suitable for the received font environment is embedded and transmitted to the client. In addition, in the present embodiment, the client itself reproduces the intermediate file that that client receives from the server. A detailed description of the present embodiment is given below.

(Network System Configuration)

FIG. 5 is a software block diagram of a file conversion system according to a first embodiment of the present invention. Here, the server and the client are both shown as single devices. However, the present invention is also applicable to a system in which either or both the client and the server are comprised of a plurality of devices.

In FIG. 5, the client 601 is a personal computer or other such information processing apparatus. The client 601 includes a Web browser 602, an image display unit 603 to which a display 613 is connected, a font environment acquisition unit 604, a data input/output unit 605 and an intermediate format analyzer 606. Furthermore, a data storage unit 614 is also contained in the client 601, for storing application data files created with a document processing program or other such application program, not shown, and for storing PDF files and other such intermediate files received from the server. In addition to these, system information such as a Language ID and font files that the operating system of the client holds are also saved in the data storage unit 614. In addition, a database of software resources and hardware resources that the client has, as well as data that the client in the present embodiment checks, are also saved in the data storage unit 614.

The Web browser 602 displays HTML documents received from the server through the data input/output unit 605 on the display 614 through the image display unit 603. The typical Web browser can display an HTML document received from the user. In addition, if there is some description in the displayed HTML document data to input some sort of data on the display screen, the typical Web browser enables the user to input that data into a column corresponding to that description. Moreover, a description can be given to transmit the data thus input to the server, and the input data can be transmitted to the server if the user acts in accordance with the description. It should be noted that such description is typically supported by any commercially available representative Web browser.

The font environment acquisition unit 604 obtains the font environment from the OS. In the present embodiment, a Language ID (that is, language identification information) is used as the font environment. The OS maintains the current country setting information of that system. For example, with the Windows (registered trademark) operating system, the OS always maintains the system locale. In addition to the language environment, the locale also includes descriptive methods for dates, times and the like, currency units, and so forth. A unique ID assigned to each country/region is one type of locale information, and it is this ID that, in this invention, is called Language ID. Although the present embodiment uses Language ID, any means may be used provided that such means is capable of acquiring the client 601 font environment. In addition, if the user specifies on the Web browser the Language ID of the computer that reproduces the intermediate file, then it is also possible to create an intermediate file suitable for the specified language/region font environment instead of the font environment of the client that requests creation of the intermediate file (which will be described in detail with reference to a third embodiment).

The data input/output unit 605 communicates and exchanges data with the server 608 through a telephone line, LAN or the like 607. In addition, in FIG. 5, an input/output device such as a keyboard, a pointing device or the like is also connected to the data input/output unit 605.

If the HTML document received from the server is a file in intermediate format, that is, an intermediate file, then the intermediate format analyzer 606 analyzes the intermediate file and displays it on the display 613 through the image display unit 603, or, alternatively, prints out the file from a printer connected to the client. Specifically, the Adobe Reader or the like from Adobe Systems Incorporated used when the intermediate file is a PDF file corresponds to the format analyzer 606.

The network 607 that connects the client 601 and the server 608 may be a LAN, the Internet, a wireless network or the like, the particular form of which is unimportant so long as it can support Web environment communications procedures.

The server 608 is at least a Web server that supports HTTP, and, like the client 601, is a personal computer or other information processing apparatus. The server 608 must further support file transfer protocols such as FTP or WebDAV. The server 608 contains a network communications controller 609, a data storage unit 610, a file conversion manager 611 and a file converter 612.

The server 608 receives data from the Web browser 602, analyzes the data, and, in some cases, depending on the data received, replies to the Web browser 602 with data searches and results from the data storage unit 610. At these times, if there is a description provided in the HTML document to input by button from the Web browser 602 and transmit the results to the server 608, then the Web browser 602 displays the buttons and data is transmitted to the server 608 when the user performs an operation such as pressing the buttons on the Web browser 602. The server 608 analyzes the data received based on the HTML document transmitted to the client 601 and if necessary responds to the Web browser 602.

The network communications controller 609, because the server 608 functions as a Web server, transmits data to the client 601 or receives data from the client so that.

The data storage unit 610 is a database, and stores application data files that comprise the original data to be converted. An application data file may, for example, be a data file created using an application program such as a document creation program. It should be noted that although the present embodiment is described terms of an arrangement in which an application data file targeted for conversion is stored in the server 608 in advance, alternatively, the application data file to be converted may be input from the client 601 through the Web browser 602.

Figure 6:
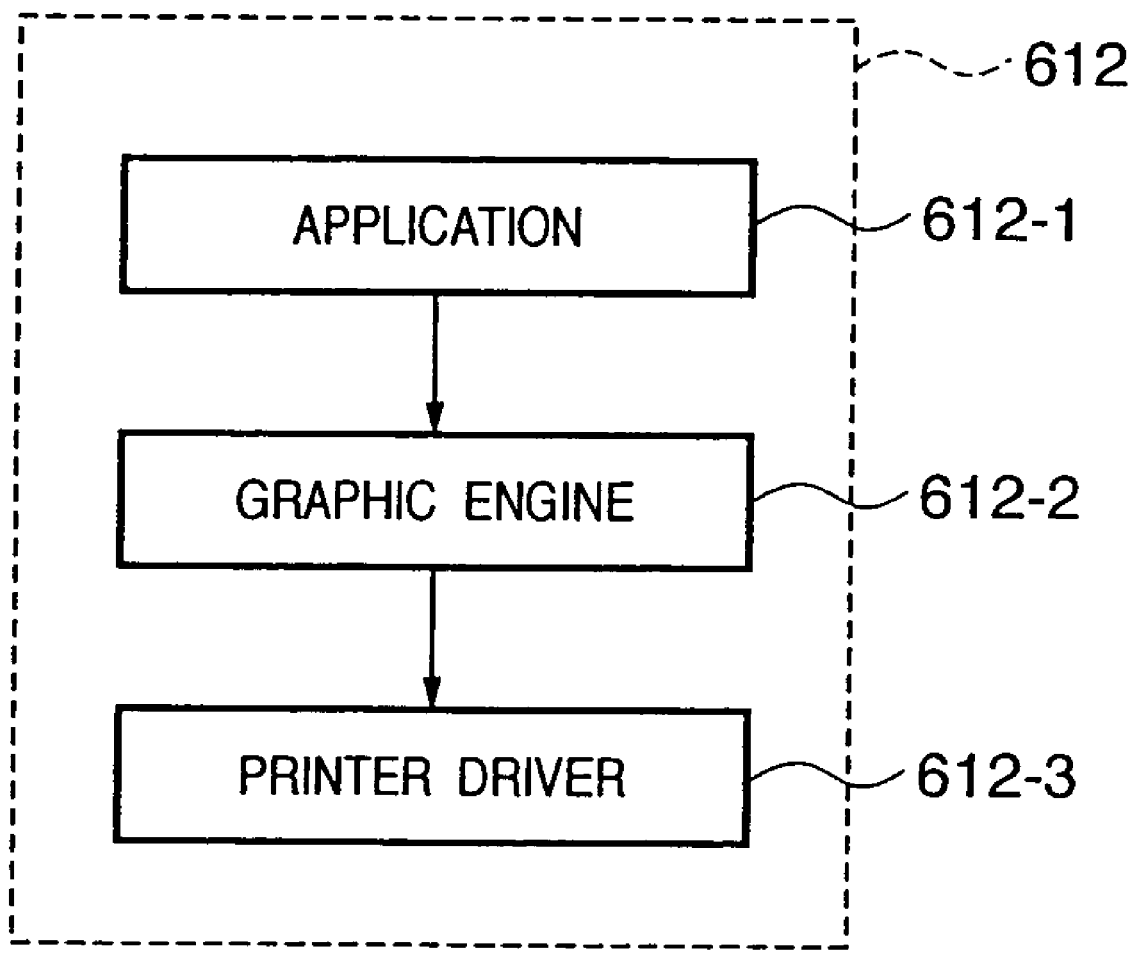
FIG. 6 is a software block diagram of the interior of a file converter shown in FIG. 5 in an embodiment of the present invention.

The file conversion manager 611, when it receives an application data file to be converted from the client 601, determines whether or not an application program that can handle that application data file is present in the server 608, and issues a conversion instruction to the file converter if such an application program is present. This determination, if the Windows (registered trademark) file system is being used, can be carried out on the basis of the application data file extension, for example, and, if the application data file has as attributes the name of the application that handles the file, a determination can be made on the basis of those attributes. The file converter 612 accepts the application data file to be converted from the client and converts the file into an intermediate format in which the embedded font is optimized according to the font environment of the computer that reproduces the intermediate file (in this embodiment, the Language ID). The file converter 612, as shown in FIG. 6, is composed of an application 612-1 capable of printing the application data file, a graphic engine 612-2 and a printer driver 612-3. The printer driver here is not a driver that controls the printer as a logical device but software that converts data (commands) input from the graphic engine 612-2 into an intermediate file command sequence and outputs it as an intermediate file.

(Hardware Configuration)

Figure 7:
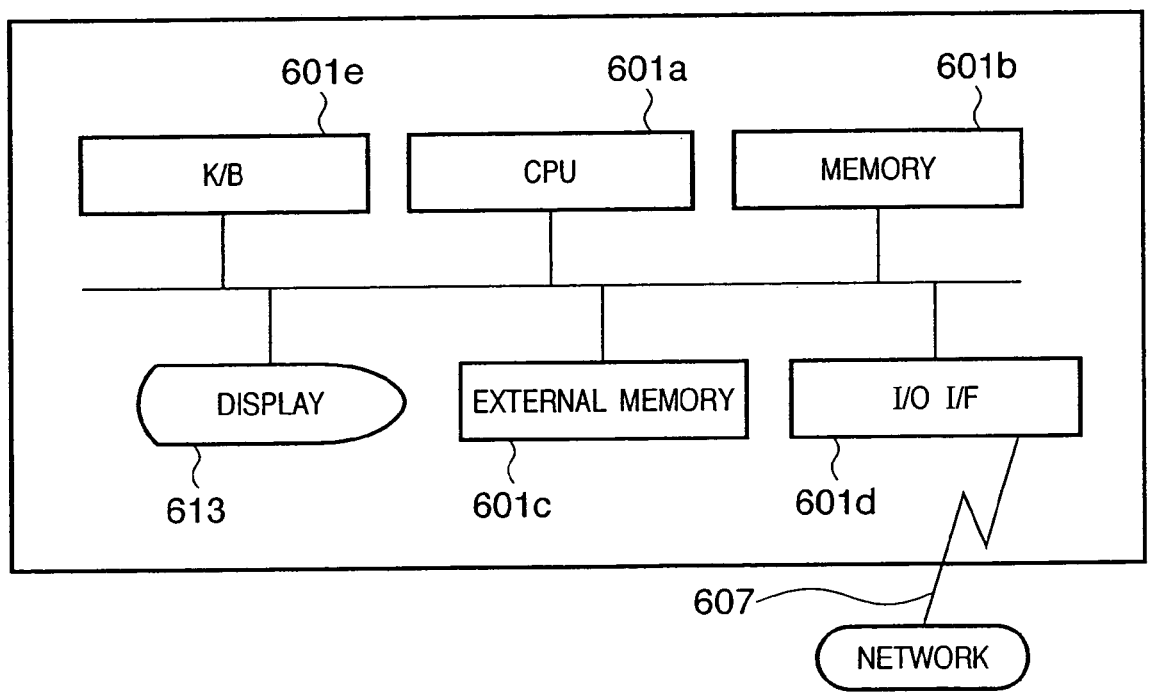
FIG. 7 is a diagram showing a hardware configuration of an information processing apparatus that can be used as a client and a server.

FIG. 7 is a diagram showing a hardware configuration for an information processing apparatus that can be used as a client and a server. The configurations of the client 601 and the server 608 shown in FIG. 5 are implemented in the configuration shown in FIG. 7 by executing a program stored in a memory 601b by a CPU 601a. In addition, the program for implementing the configuration shown in FIG. 7 is stored in a hard disk or other external memory 601c. The external memory 601c may be a removable storage medium such as a floppy disk, a CD-ROM or the like. In addition, the data storage units 610, 614 can be implemented as one portion of the external memory 601c.

An image is displayed on the display 613 (in the case of the client 601), which is connected to the network or the like 607 through an I/O interface 601d. An operator enters necessary input using a keyboard and/or pointing device 601e.

(Network Conversion System Processing Procedure)

Figure 8:
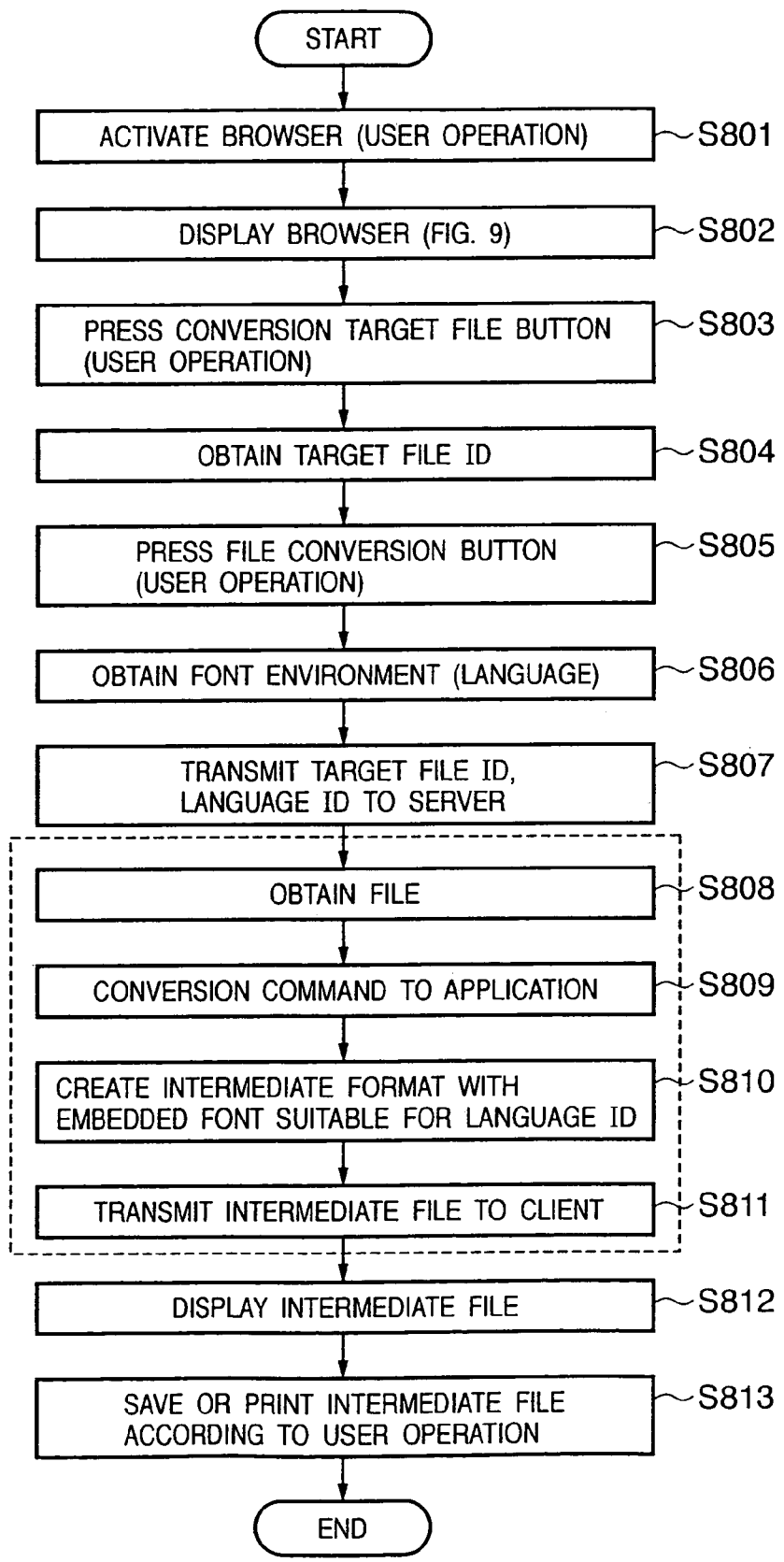
FIG. 8 is a flow chart illustrating the flow of a series of processes performed by a network file system according to an embodiment of the present invention.

Next, a description is given of the outlines of the system of the present invention using the flow chart shown in FIG. 8. When a server 608 document (application data file) from the client 601 is read, first, in a step S801, the browser program 602 is started at the client. The browser may be any commonly used Web browser or the like.

Figure 9:
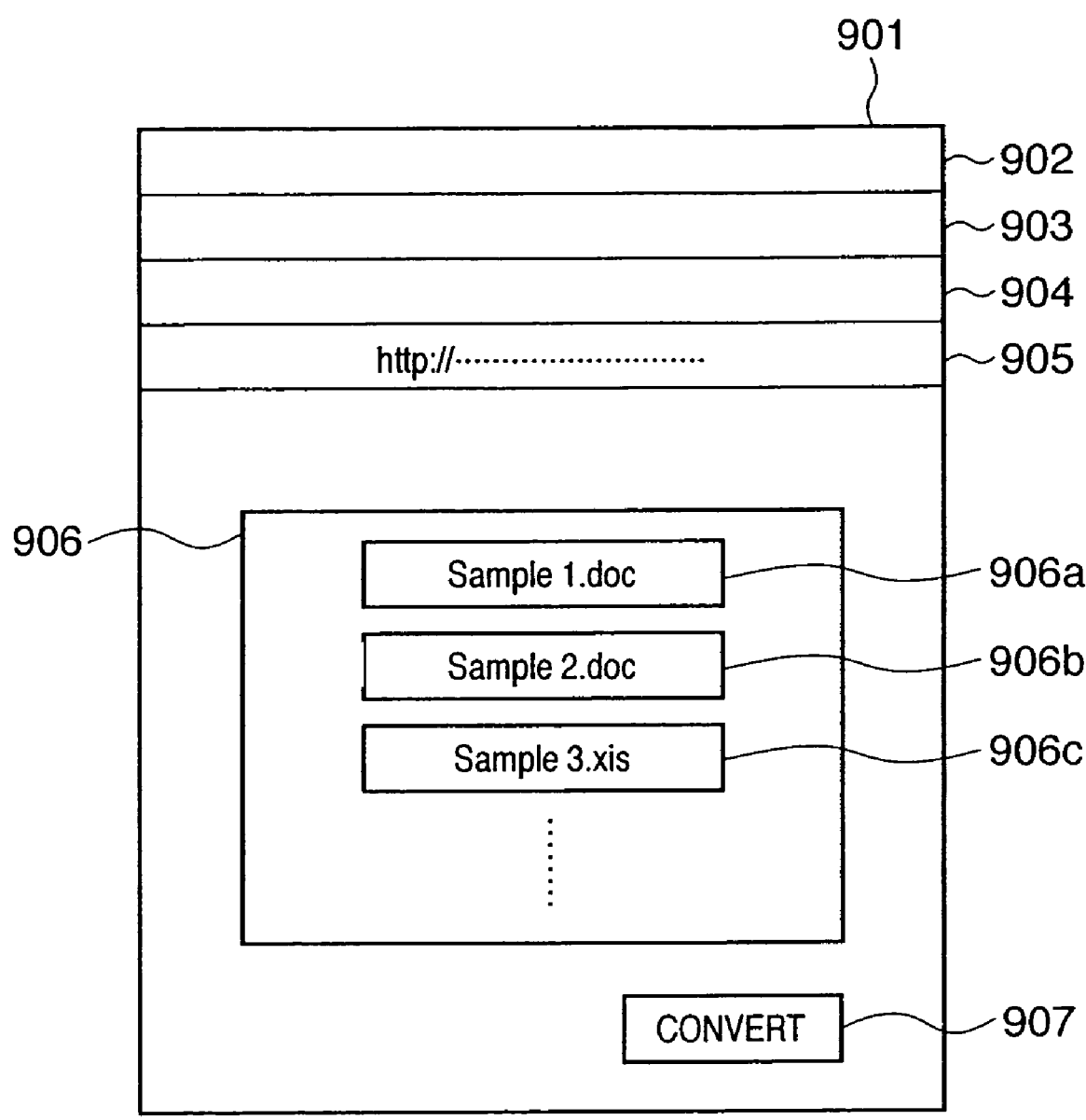
FIG. 9 is a diagram showing a sample display screen of a Web browser of a client, in a first embodiment of the present invention.

FIG. 9 is a diagram showing an example of an HTML document according to a file conversion process displayed by the browser 602. In FIG. 9, a window 901 is the window of the browser 602 displayed on the display 613. A title attached to the document is displayed in the display area 902. Browser 602 commands are displayed in areas 903 and 904 in the format of a tool bar and buttons. Commands for printing the contents displayed in the browser are also usually displayed in these areas. Area 905 is a URL field that inputs and outputs a connected Web server address and a document URL and the like. The HTML document is specified by the URL input here. When the Web browser 602 is activated, the title area 902 to the URL field 905 are displayed and a document specified by a URL set in the browser in advance is displayed in the other columns.

Next, in a step S802, the user inputs the URL that executes the service of the system into the URL field 905 using a keyboard and the like. When the URL is input, the HTML document corresponding to the input URL is read out and displayed. In the present embodiment, the input URL is an address for providing a document in an intermediate format by the server 608. Then, when that URL is specified, a connection is made to the server 608 and the HTML document including columns 906-907 is read from the server 608 and displayed. The drop-down menu 906 is a field in which a list of application data files provided by the server 608 is displayed. The client user can select a desired application data file from this list. A database table 1001 that correlates file IDs 1002 and file names 1003 as shown for example in FIG. 10 is held in the data storage unit 610 of the server 608. In addition, a description to display in the drop-down menu 906 all the file names 1003 in the database table 1001 as file selection buttons is included in the HTML document that the server 608 transmits to the client 601. The browser 602 that receives that HTML document, in accordance with that description, displays the file selection buttons 906a-906c. In other words, because the application data file names are displayed as buttons in accordance with the address (URL) input into the URL field 905, the file selection buttons 906a-906c display the file names read from the server data storage unit 610. In addition, besides the selection buttons 906, a conversion button 907 for starting the conversion process is included in the HTML document displayed at the client 601.

Next, in a step S803, the user presses one of the file name selection buttons displayed in the drop-down menu 906 using a pointing device or a keyboard. When the file name selection button is pressed, a description is given to store a file ID 1002 that corresponds to a file name selected in a step S804 in the file ID column 1103 of a client request table 1101 like that shown for example in FIG. 11.

Similarly, in a step S805, the user presses the conversion button 907 using the pointing device or keyboard, thus writing into the HTML document transmitted from the server a description to process in the manner described below when the conversion button is pressed.

When the conversion button is pressed, first, in a step S806, a font environment request is submitted to the browser font environment acquisition unit 604. In the present embodiment, Language ID is used as the font environment. Typically, because Language ID is held by the OS, the font environment can be obtained by querying the OS. The Language ID thus obtained is then stored in the Language ID 1102 in the client request table 1101.

Next, in a step S807, the held client request table 1101 is transmitted to the server 608. The succeeding steps, from S808 to S811 (inside the dotted lines shown in FIG. 8) are executed by the server 608.

Next, in a step S808, the server 608 searches the database table 1001 stored in the data storage unit 610 using the file ID 1102 which is the entry in the client request table 1101 thus received as the key and obtains the file that matches the file ID. Then, in a step S809, the file conversion manager 611 issues a target file conversion command to the application that can handle the target file. The target file is a file that corresponds to the file ID recorded in the file ID 1103 of the client request table 1101. Designation of the application that can handle the target file is a capability that is typically provided to the OS. For example, with Windows (registered trademark), information that correlates the file extension and the application is saved by the operating system, so that, when an instruction is given to open a file, the corresponding application is executed. Next, in a step S810, the file converter 612 that receives the conversion command from the file conversion manager 611 generates an intermediate file. A detailed description of the process of intermediate file conversion will be given immediately after a description of FIG. 8. Then, in a step S811, the server 608 transmits the intermediate file thus created to the client 601. Here, in order to simplify the description, the intermediate file is transmitted to the client 601. In actuality, however, it is preferable that the URL of the created intermediate file be sent to the client 601 without the created intermediate file itself being transmitted to the client 601.

Next, in a step S812, the client 601 downloads the intermediate file received at the Web browser 602 or the intermediate file held by the URL received, the intermediate format analyzer 606 analyzes the download, converts it into displayable bitmap data and displays it on the display 613 through the image display unit 603. Then, further, in response to user input, the intermediate file is saved. Alternatively, the intermediate file can be analyzed by the intermediate format analyzer 606, converted into a printable data format such as PDL adapted to a printer, and printed out by the printer.

In steps S812 and S813, display and printing are carried out using an alternative font if the font face specified by the intermediate file character object operand is not installed in the client 601. The alternative font is specified in advance for the font. Alternatively, a default font may be determined and the document reproduced using the default font if the specified font does not exist.

(Conversion to Intermediate File)

Next, a detailed description is given of the procedure for conversion to the intermediate file by the file converter 612. In the present embodiment, a print function installed on the OS is used as the file conversion means. First, a description is given of the structure of the print function.

Figure 1:
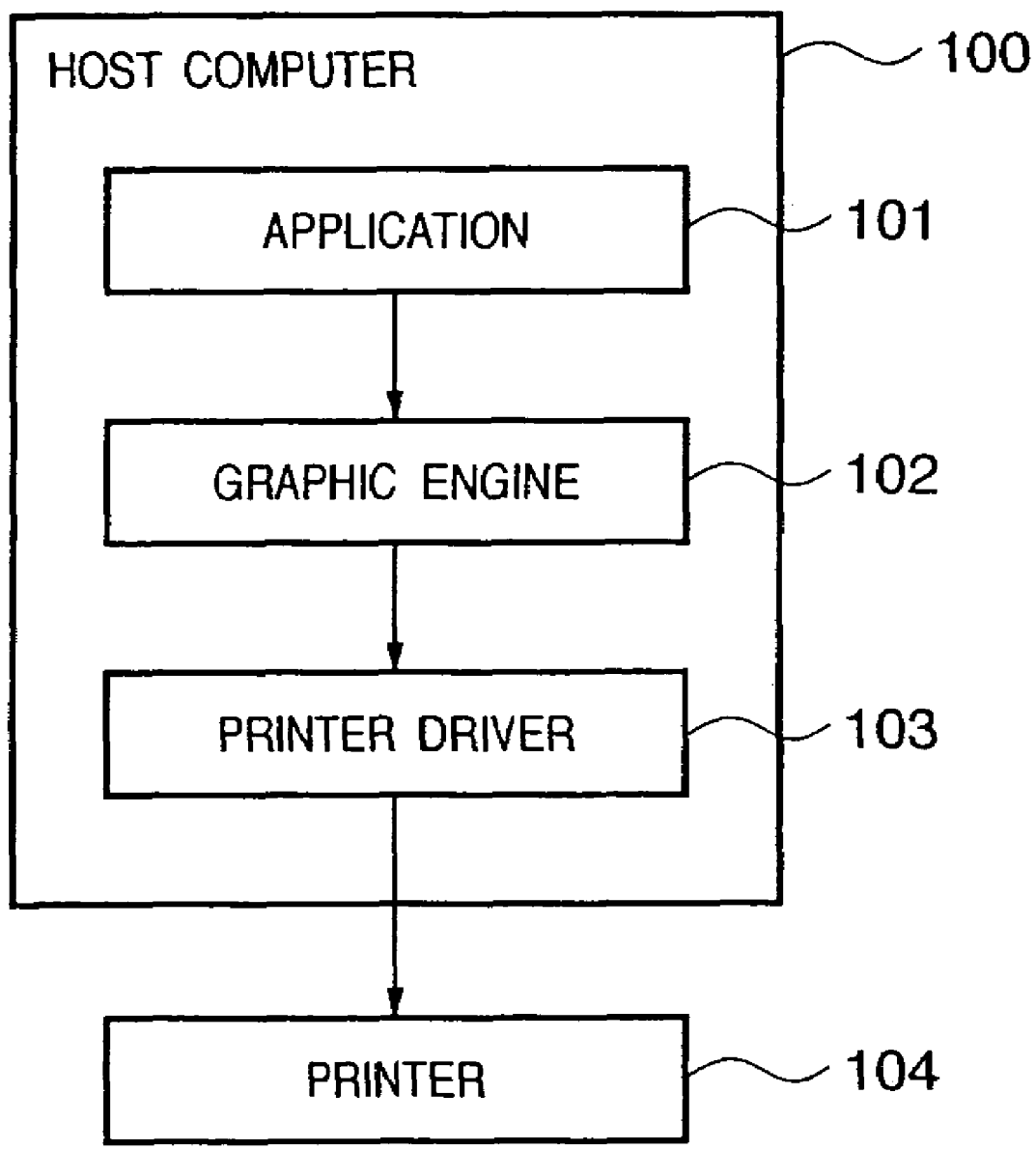
FIG. 1 is a typical functional block diagram of a print control device of a type that converts print commands from a conventional application into printer control commands.

FIG. 1 is a schematic diagram showing the functional structure for a print process in a personal computer or other such ordinary information processing apparatus (hereinafter "host computer") acting as a print control apparatus that provides print instructions to a printer 104 conventionally connected either directly or through a network.

The host computer 101 runs application software 101 such as a word processor or a spreadsheet (hereinafter "application") on so-called basic software (i.e., the operating system, hereinafter "OS") such as Windows (registered trademark). When printing from the application 101, from among several sub-programs that the OS provides from within that program a graphic engine 102 function is used. The graphic engine 102 is, for example, in Windows (registered trademark) called a GDI (Graphic Device Interface), and controls processing of image information for the display and the printer. In order to absorb dependency on devices such as the display and the printer, the GDI dynamically links modules called device drivers and outputs to each of the devices. The module for the printer 104 is called a printer driver 103. The printer driver 103 must prepare a function group called a DDI (Device Driver Interface) that is determined in advance to be installed in the device driver according to the capacity and capabilities of the device. The GDI converts an application 101 API (Application Programming Interface) call into device driver data, and the DDI function group is configured so as to be called from the GDI as appropriate and a predetermined print process executed. The graphic engine 102 sequentially processes print requests from the application through this type of printer driver 103.

Depending on the use application, the printer driver 103 can be broadly divided into printer output systems and file output systems. The printer output system converts rendering commands into an intermediate format called PDL (Printer Description Language). The printer output system intermediate format (PDL) is designed to install on the printing device side a controller that is capable of processing PDL control commands, and prints using the printer on the printing device side.

By contrast, sending data to the printing device side is not the direct purpose of the file output system, which converts rendering commands accepted from the DDI functions into an intermediate format defined in advance which it then stores as an intermediate file on a disk system of the host computer 101. PDF (Portable Document Format) and SVG (Scalable Vector Graphics) are typical intermediate formats. The intermediate file is saved on the host computer file system, displayed on the host computer by a particular application 101 capable of interpreting the intermediate format, and can be printed by the printing device at the instruction of the user, again through the graphic engine 102.

The DDI functions include a "job start request" that announces the start of printing, a "page start request" that announces the start of a page, a "logic rendering request" expressing characters, figures and the like described in a page, a "page end request" that announces the end of a page, and the like. When printing multiple pages, the number of "page start requests" and "page end requests" output is the same as the number of pages printed, and the number of "logic rendering requests" output is the number of logic renderings contained in the pages. The printer driver 103 generates commands in an intermediate format such as PDL, PDF or the like for each request.

(File Conversion Process)

Figure 2:
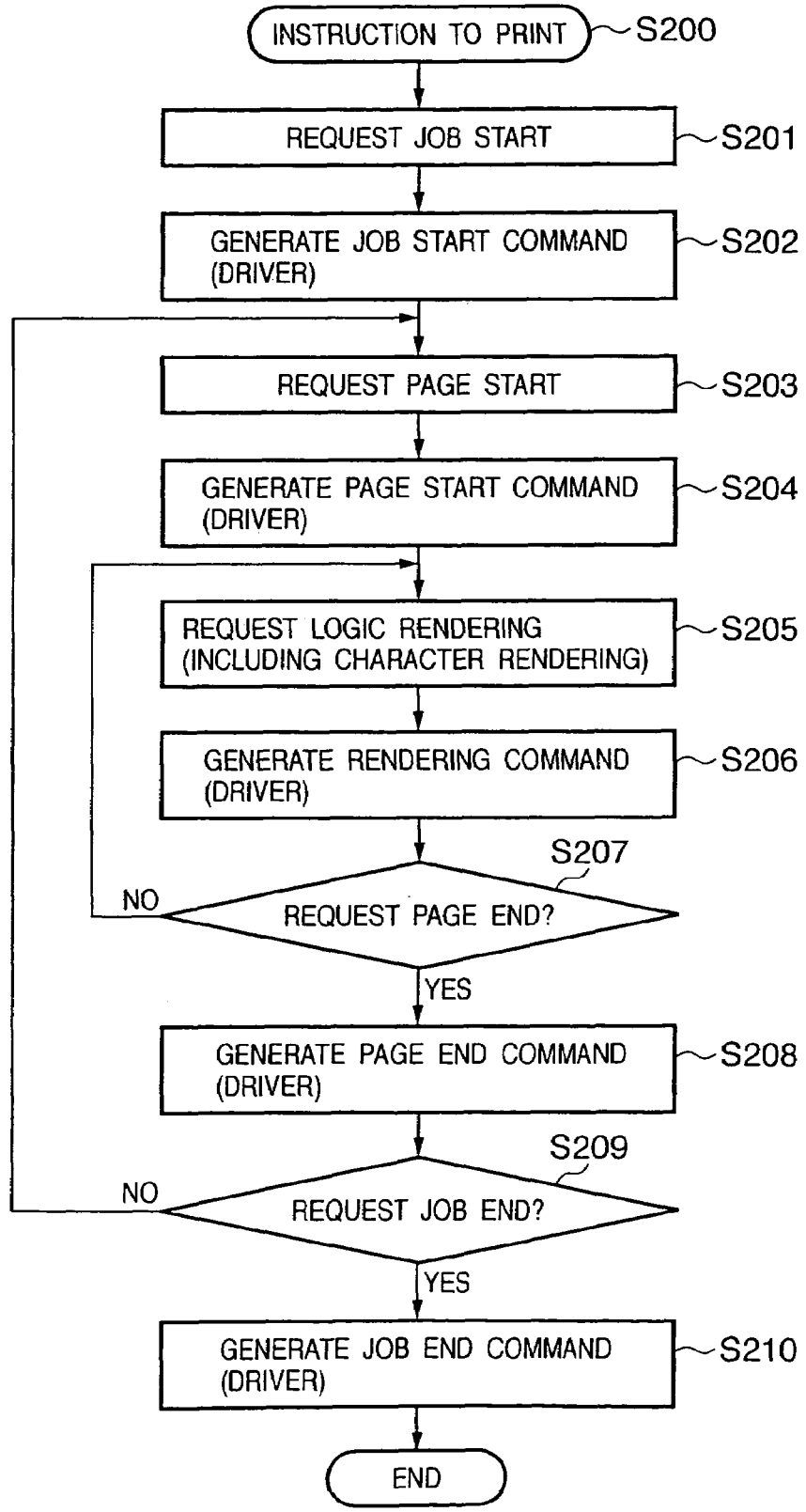
FIG. 2 is a flow chart illustrating the flow of a series of printing processes from a conventional application.
Figure 4:
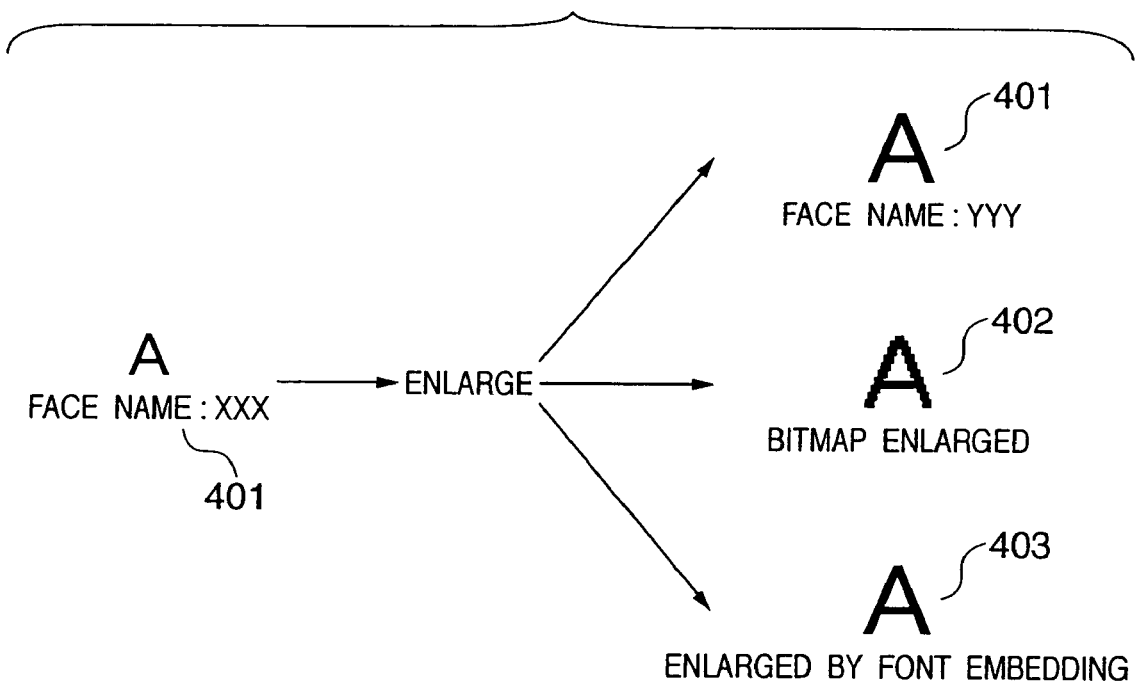
FIG. 4 is a diagram showing sample print results where font substitution and bitmap substitution have occurred in character rendering.

Using FIG. 2, a detailed description is now given of the flow of processing within the file converter 612 having received a conversion command from the file conversion manager 611. When the file converter 612 receives a file conversion command, first, the application 612-1 starts conversion by outputting a request to convert the target file into an intermediate format to the printer driver 612-3 through the graphic engine 612-2 (S200).

The application 612-1 reports the start of a conversion job to the graphic engine 612-2 through the GDI function. The graphic engine 612-2 then converts the reported GDI function to a DDI function and transfers it to the printer driver 612-3 (S201). The printer driver 612-3 then generates a job start command (S202).

The application 612-1 reports the start of a page to the graphic engine 612-2 through the GDI function. The graphic engine 612-2 then converts the reported GDI function to a DDI function and transfers it to the printer driver 612-3 (S203). The printer driver 612-3 then generates a page start command (S204).

The application 612-1 reports a logic rendering request to the graphic engine 612-2 through the GDI function. The graphic engine 612-2 then converts the reported GDI function to a DDI function and transfers it to the printer driver 612-3 (S205). The printer driver 612-3 then generates a logic rendering command (S206).

Steps S205 and S206 are repeated until a page end request is reported from the application 612-1. The application 612-1 then reports the end of the page to the graphic engine 612-2 through the GDI function (S207). When the graphic engine 612-2 converts the reported GDI function into a DDI function and transfers it to the printer driver 612-3, the printer driver 612-3 then generates a page end command (S208).

Steps S203 to S208 are repeated until a job end request is reported from the application 612-1. When the application 612-1 reports the end of a job to the graphic engine 612-2 through the GDI function (S209) and the graphic engine 612-2 converts the reported GDI function into a DDI function and transfers it to the printer driver 612-3, the printer driver 612-3 generates a job end command (S210).

(Character Rendering Process)

Figure 12:
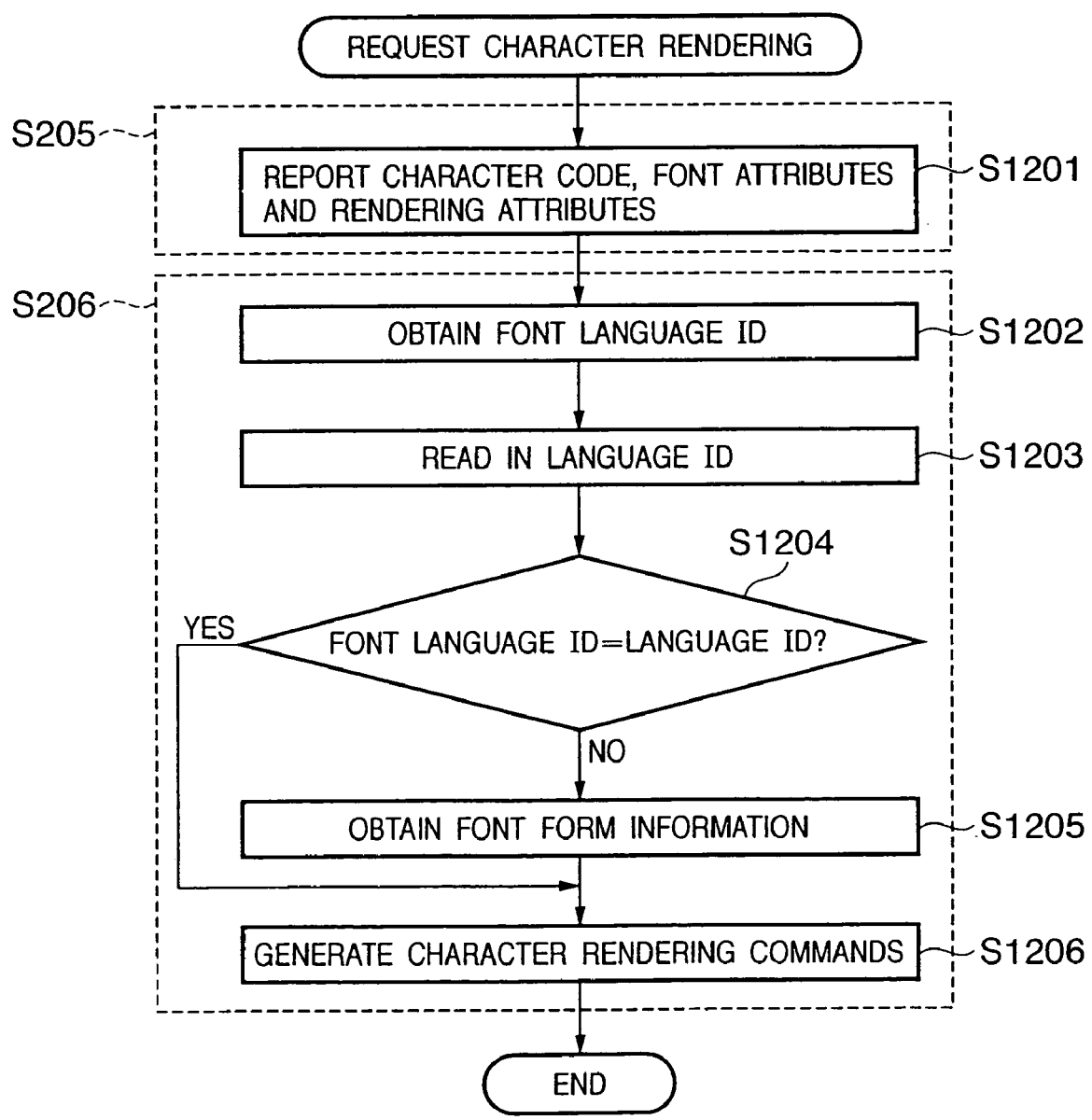
FIG. 12 is a flow chart illustrating steps in a process performed at a printer driver when there has been a character rendering request from an application, in the first embodiment of the present invention.

Next, a description is given of the character rendering commands in the logic rendering process of step S205, using the flow chart shown in FIG. 12. In FIG. 12, step S1201 is part of step S205 shown in FIG. 2 performed by the application and the graphic engine, and steps S1202-S1206 are part of step S206 carried out by the printer driver. Although a similar rendering process is carried out on the graphics and images, such process is omitted from FIG. 12.

The application 612-1 reports the character code, font attributes and rendering attributes to the graphic engine 612-2 through the GDI function. The graphic engine 612-2 then converts the GDI function into a DDI function and transfers it to the printer driver 612-3 (S1201).

Next, the printer driver 612-3 queries the graphic engine 612-2 for the font Language ID based on the font face name included in the font attributes accepted as GDI index parameter data. If, for example, the font Language ID is a TrueType (registered trademark) font, then the font Language ID is stored in a name table in a TrueType (registered trademark) font table. In terms of Windows (registered trademark), there is a TrueType (registered trademark) font in the font table, which is a table that can be utilized in Windows (registered trademark), and which can be checked in order to obtain the font Language ID (S1202).

Next, the printer driver 612-3 checks the Language ID 1102 in the client request table 1101 held in the data storage unit 610 and obtains the Language ID (S1203).

If the locales match, the font Language ID and the Language ID are the same value. For example, the Language ID value that indicates Japan is 1041, and the font Language ID that indicates the Japanese language font is also similar set at 1041. Then, the Language ID value and the font Language ID value are compared, and if the two do not match the process proceeds to a step S1205 in order to embed font form information. If the two values do match, then the process proceeds to a step S1206 (S1204).

Based on the font attribute face name and character code, the printer driver 612-3 queries the graphic engine 612-2 for, and acquires, the font form information (S1205).

The printer driver 612-3, using the character code, font attributes, rendering attributes and font form information thus obtained, generates character rendering commands in an intermediate format. By contrast, if the font is one for which embedding is deemed unnecessary, then the above-described acquisition of font form information is unnecessary, and therefore the printer driver 612-3 generates character rendering commands in an intermediate format using the character code, font attributes and rendering attributes (S1206).

As described above, in the document processing system of the present embodiment, when reproducing a document file at the client, if the font Language ID of the font that comprises the document file (the intermediate file) and the client Language ID match, the client reproduces the file using the font form information of the font installed in the client and does not embed the font form information in that document file.

In addition, even if the same font as the font used in the document file is not installed in the client that reproduces the document file, the client that reproduces the document file uses a font that resembles the font used in the document file. Accordingly, even if the reproduced style is different from the original style of the created document, because the document is reproduced in characters of the same language the contents of the reproduced document can be read out.

In addition, because the operator is not burdened with determining whether or not to embed a font in a document file and determining the font to be embedded, the operator does not need to be knowledgeable about computer systems and fonts, thus improving operability. Moreover, the procedure for specification is unneeded, and therefore file generation productivity also improves. Moreover, mistaken embedding of a font or failure to embed a font can be prevented.

Second Embodiment

In the first embodiment, the font environment acquisition unit 604 obtains the Language ID. However, in a second embodiment, the font environment acquisition unit 604 queries the OS for the fonts that the client 601 holds, transmits to the server 608 all the face names of the fonts that the client 601 can use, the server 608 creates an intermediate file suitable for the font environment, and the intermediate file thus created is transmitted to the client 601. The details of this process are described below.

(Processing Procedure of the Second Embodiment)

Figure 14:
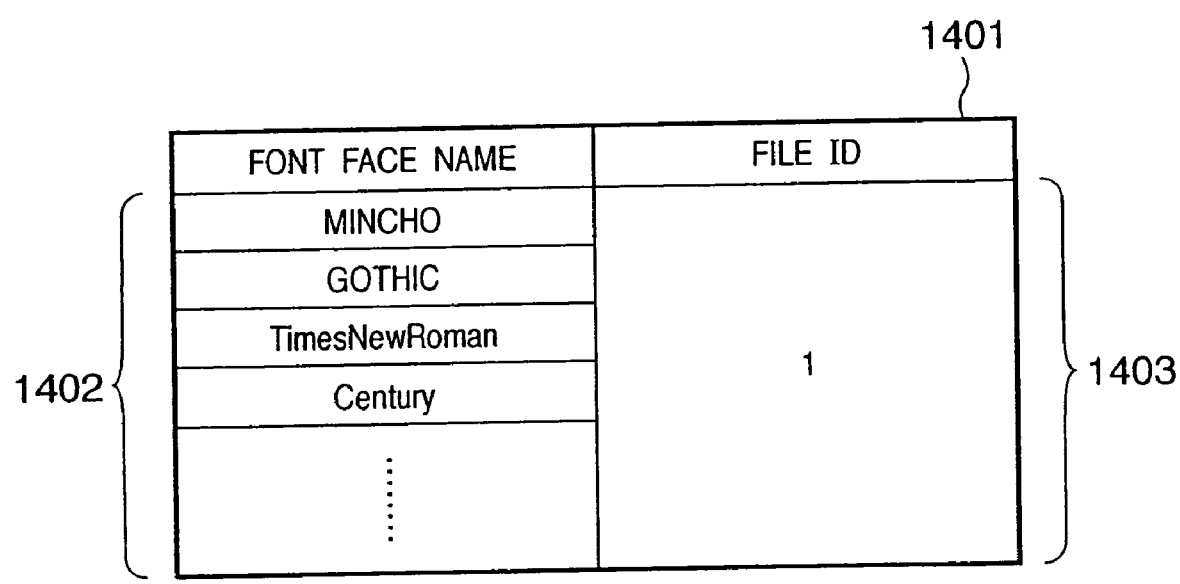
FIG. 14 is a diagram showing a sample of a client request table used in a second embodiment of the present invention.

Next, a description is given of the second embodiment, focusing on the difference with the first embodiment described above. In the second embodiment, in the flow chart shown in FIG. 8, the operations and process of from step S801 through step S805 are the same as in the first embodiment. In the second embodiment, in a step S806, when the font environment is acquired, the OS is queried for the fonts that the client 601 holds and the face names of all the fonts that the client can use are stored in a font list 1402 in a client request table 1401 shown in FIG. 14. It should be noted that the client request table 1101 used in the first embodiment is not used in the second embodiment.

Next, the process of from step S807 to S812 is the same as with the first embodiment of the present invention, although the conversion to the intermediate file (S810) differs from that of the first embodiment.

(Character Rendering Process)

Figure 15:
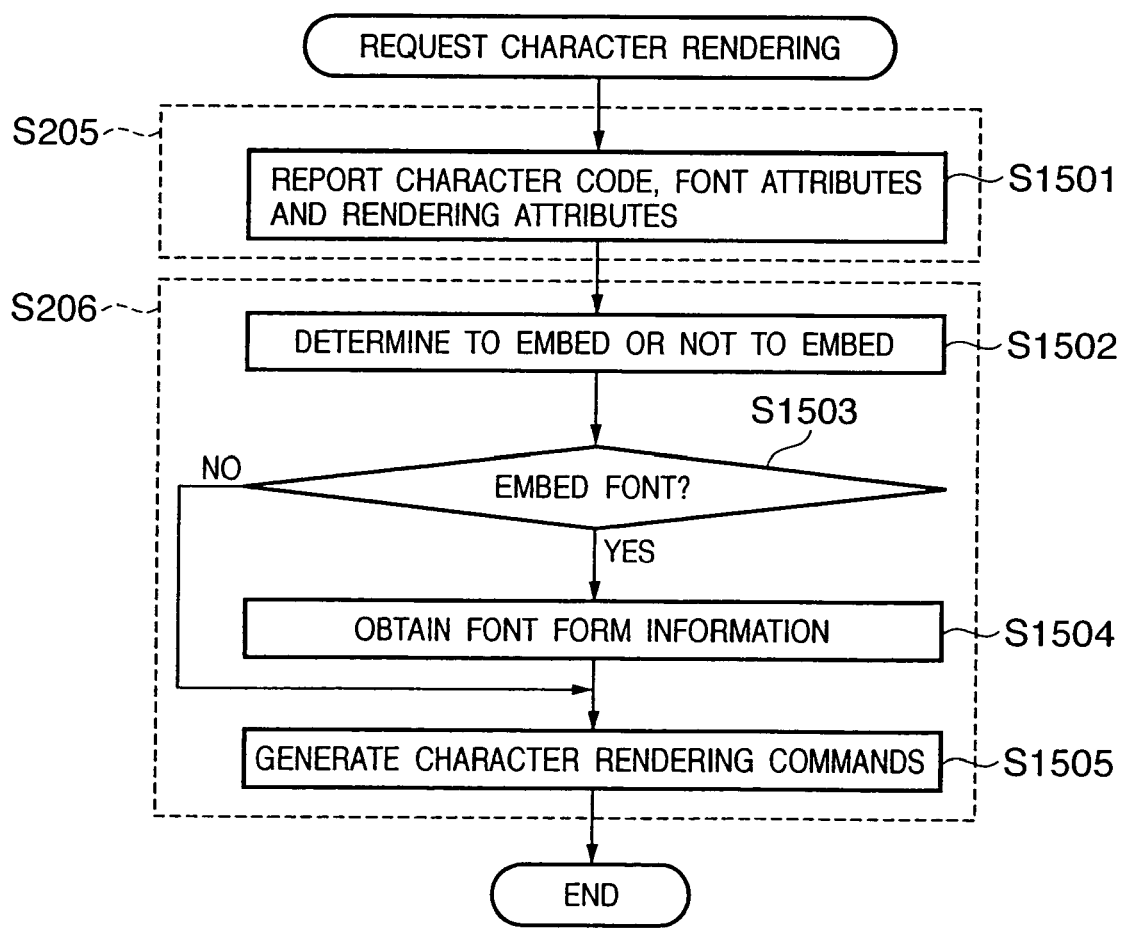
FIG. 15 is a flow chart illustrating steps in a process performed at a printer driver when there has been a character rendering request from an application, in the second embodiment of the present invention.

Next, a detailed description is given of the procedure for conversion to an intermediate file in the second embodiment. Fundamentally, although the procedure for conversion to an intermediate file in the second embodiment is the same as that of the first embodiment, the procedure for character rendering differs from the procedure of the first embodiment. Here, a description is given of the character rendering procedure using FIG. 15. FIG. 15 shows a procedure in which steps S205 and S206 of FIG. 2 are executed by the server 608 in place of FIG. 12 of the first embodiment.

In FIG. 15, when the application 612-1 issues a character rendering request, the character code, font attributes and rendering attributes are reported to the graphic engine 612-2 through a GDI function. The graphic engine 612-2 then converts the GDI function into a DDI function and transfers it to the printer driver 612-3 (S1501).

Next, the printer driver 612-3 ascertains whether or not a font that is the same as the face name of the accepted font is present in the font list 1402 in the client request table 1401 (S1502). If such a font is not in the font list 1402, then the process shifts to a step S1504 in order to embed that font and shifts to a step S1505 if such a font is present in the font list 1402 (S1503). Based on the printer driver 612-3 font attribute face name and character code, the printer driver 612-3 queries the graphic engine 612-2 and obtains the font form information described above (S1504). The printer driver 612-3 then generates character rendering commands in an intermediate format using the character code, font attributes and rendering attributes thus obtained. By contrast, if the font is one for which embedding is deemed unnecessary, then the above-described acquisition of font form information is unnecessary, and therefore the printer driver 612-3 generates character rendering commands in an intermediate format using the character code, font attributes and rendering attributes (S1505).

In other aspects, the configuration and procedures of the second embodiment are the same as those of the first embodiment. According to the configuration and procedure described above, the document processing system of the present embodiment, because it does not embed font form information installed in the terminal (computer) that reproduces the document file (the intermediate file) in that document file, expansion of the size of the document file by unneeded font form information can be prevented. Furthermore, because the font form information that is not embedded in the document file is surely installed in the terminal that reproduces that document file, the created original document is reproduced as is including the style of the characters.

In addition, because the operator is not burdened with determining whether or not to embed a font in a document file and determining the font to be embedded, the operator does not need to be knowledgeable about computer systems and fonts, thus improving operability. Moreover, procedures for specification are unneeded, and therefore file generation productivity also improves. Moreover, mistaken embedding of a font or failure to embed a font can be prevented.

Third Embodiment

In the first embodiment of the present invention, the client Language ID is automatically used as the font environment. However, a third embodiment of the present invention uses a Language ID that the client specifies.

(Processing Procedure of the Second Embodiment)

Figure 16:
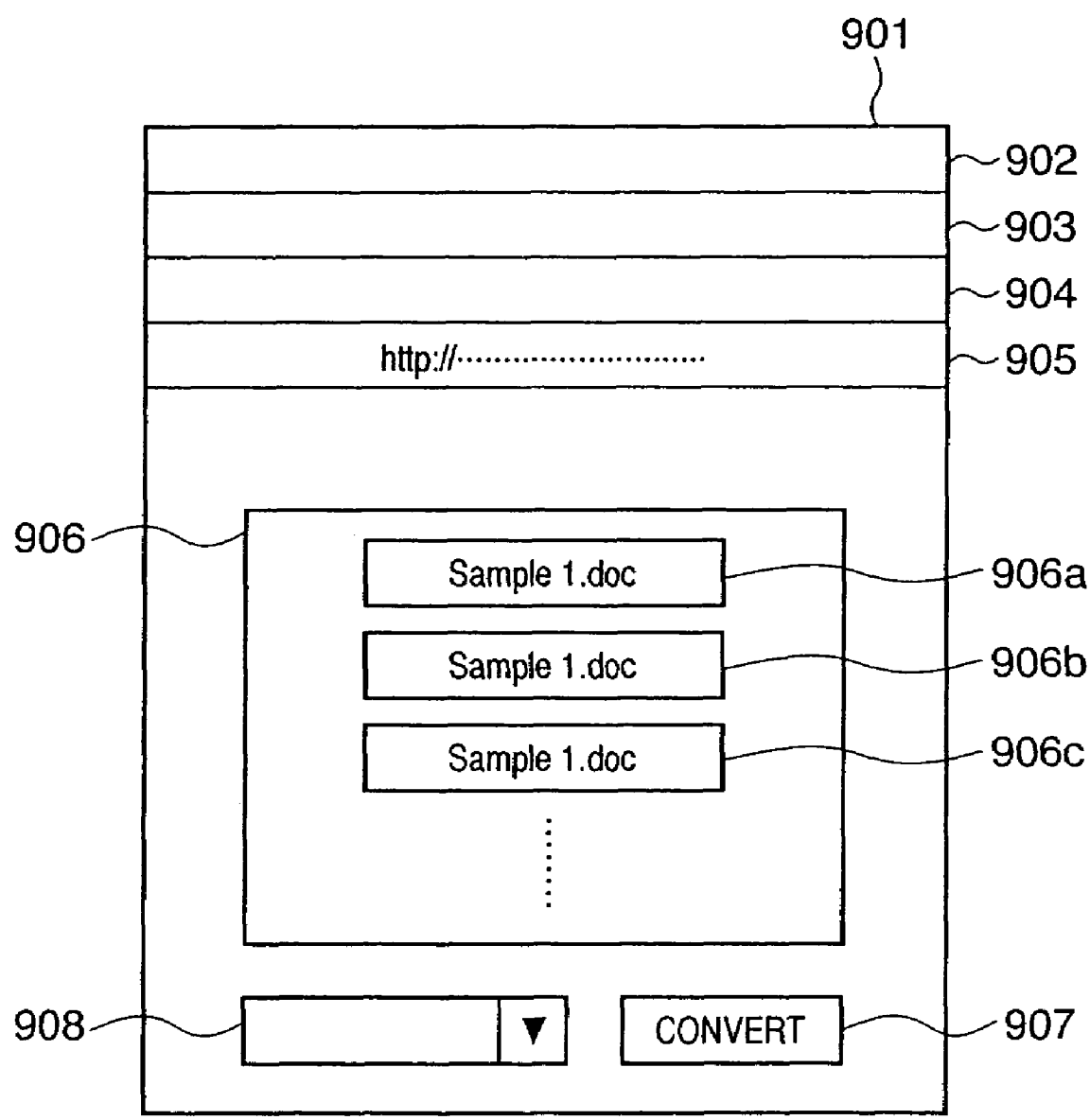
FIG. 16 is a diagram showing a sample display screen of a Web browser of a client in a third embodiment of the present invention.
Figure 17:
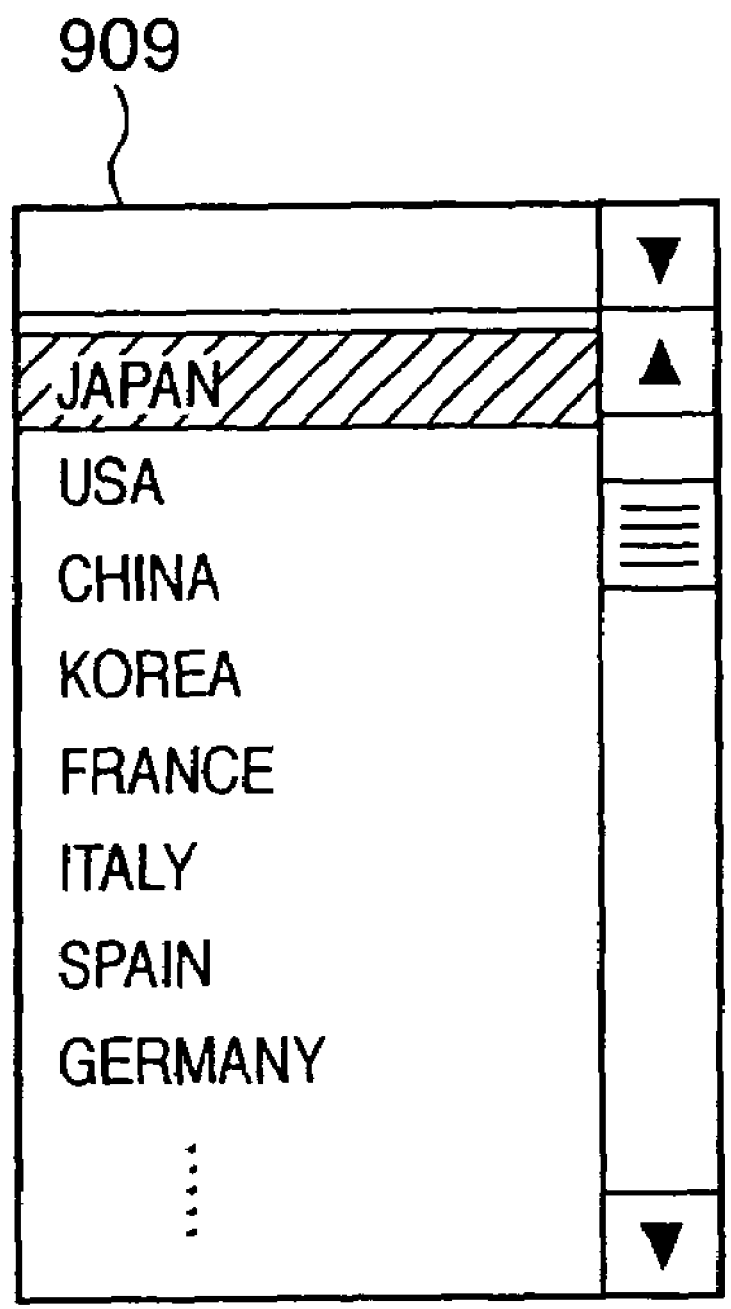
FIG. 17 is a diagram showing a sample country/region list displayed when a country/region selection button shown in FIG. 16 is pressed.

In the third embodiment of the present invention, the font environment acquisition method differs from that of the first embodiment described above. Here, a description is given of only the font environment acquisition method. The third embodiment, instead of displaying a screen like that shown in FIG. 9 in step S802 of the first embodiment, displays on a browser a screen like that shown in FIG. 16. FIG. 16 shows a screen that adds a country/region selection button 908 to the screen shown in FIG. 9. When the user presses the country/region selection button 908 using a pointing device or keyboard, a country/region list is displayed as shown in the drop-down menu 909. The data storage unit 610 is provided with a Language ID list table 1801 like that shown in FIG. 18, for example, with all the country names 1802 in the Language ID list table 1801 shown in FIG. 18 displayed as selection buttons in the drop-down menu 909.

Figure 11:
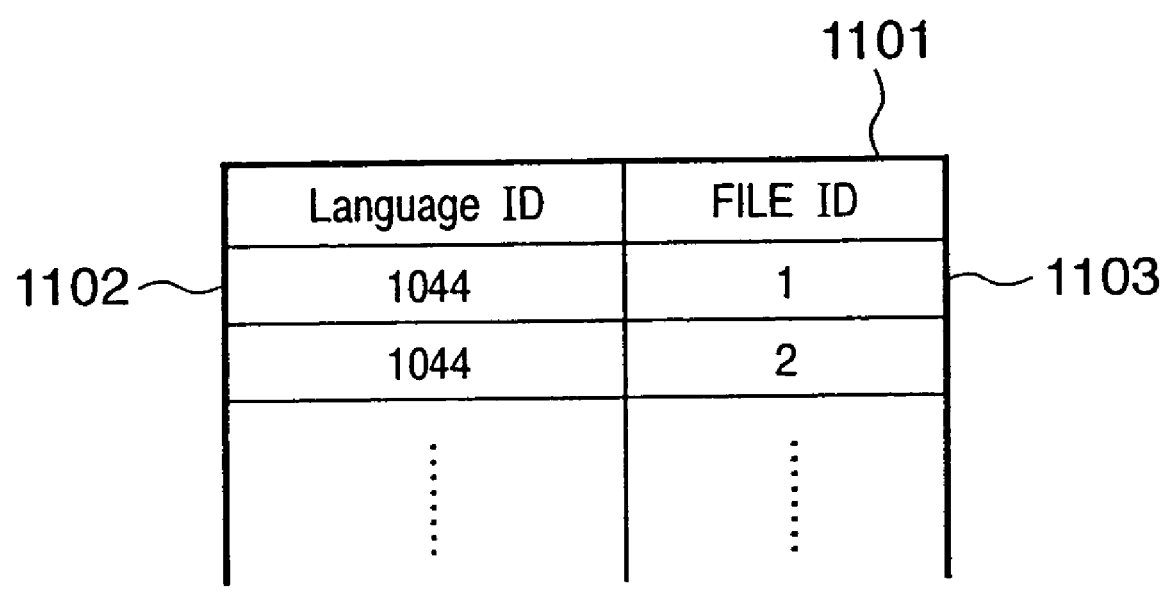

A Language ID 1803 is linked to each of the country names 1802, and when a country/region displayed in the drop-down menu 909 of an HTML document is specified on a screen using the pointing device or the keyboard, a Language ID 1803 in the Language ID list table 1801 corresponding to the selected country name is stored in the client request table Language ID 1103 shown in FIG. 11.

Hereinafter, of the processes of from step S803 to S813 shown in FIG. 8, in the first embodiment, in step S806, the font environment acquisition unit 604 automatically obtains the client Language ID. However, in the third embodiment, because the Language ID is obtained by the means described above (that is, by operator input), the process of step S806 is not carried out. The rest of the process is the same as that of the first embodiment and thus a description thereof is omitted.

According to such a configuration, in the document processing system of the present embodiment, even if the terminal (computer) that requests a document file (intermediate file) from the server is different from the terminal that reproduces the document file, if the Language ID of the terminal that reproduces the document file and the font Language ID of the document match, font form information is not embedded in that document file, and therefore expansion of the size of the document file by unneeded font form information can be prevented. In other words, a document file of the minimum required size suitable for the destination can be created.

In addition, even if the same font as the font used in the document file is not installed in the terminal that reproduces that document file, the reproduction terminal uses a font that resembles the fount used in the document. Accordingly, even if the reproduced style is different from the original style of the created document, because the document is reproduced in characters of the same language the contents of the reproduced document can be read out.

In addition, because the operator is not burdened with determining whether or not to embed a font in a document file and determining the font to be embedded, the operator does not need to be knowledgeable about computer systems and fonts, thus improving operability. Moreover, procedures for specification are unneeded, and therefore file generation productivity also improves. Moreover, mistaken embedding of a font or failure to embed a font can be prevented.

Fourth Embodiment

Figure 20A:
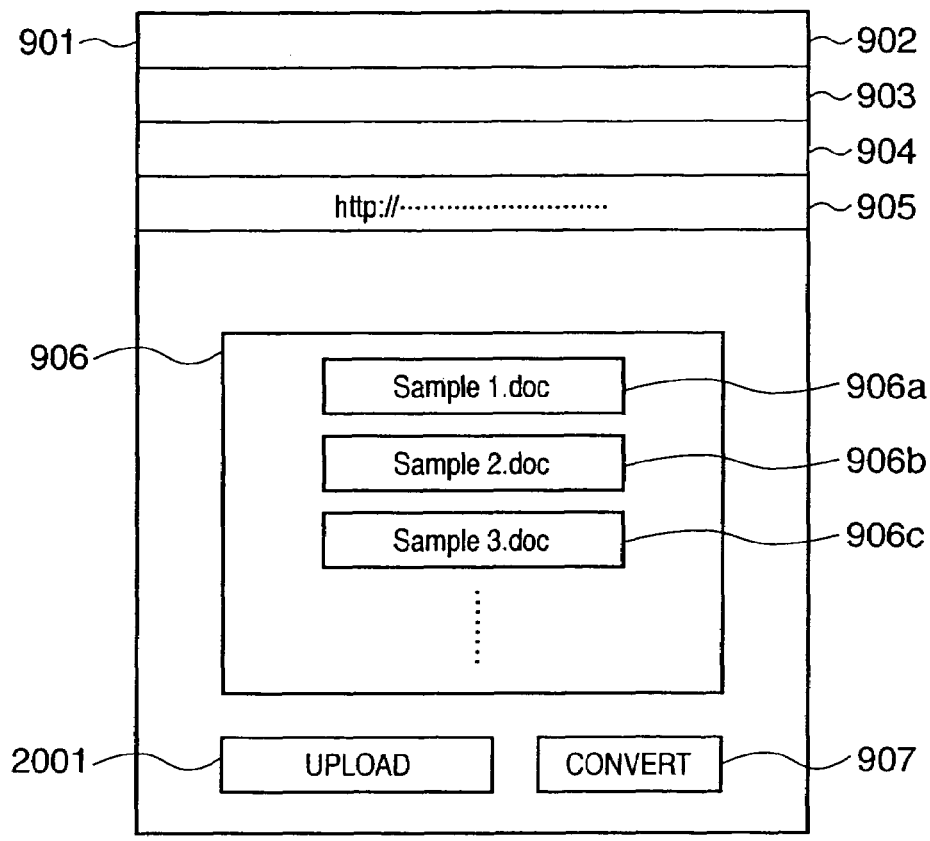
FIGS. 20A and 20B are diagrams showing examples of display screens of a client Web browser according to the fourth embodiment of the present invention.
Figure 20B:
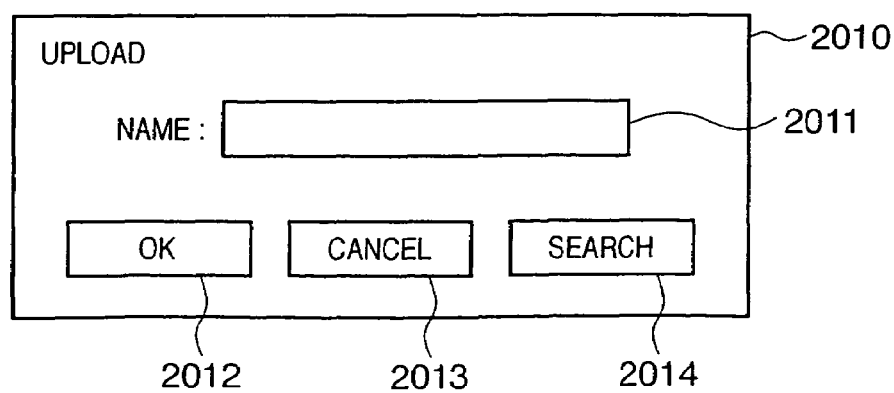

In a fourth embodiment of the present invention, a description is given of a document processing system that combines the ability to upload application data files from the client 601 to the server 608 with the acquisition of intermediate files from the server 608 of the first and third embodiments. FIG. 19 is a flow chart illustrating a procedure executed in place of the process shown in FIG. 8 of the first and third embodiments. FIGS. 20A and 20B show an example of an HTML document displayed at the client in place of the screen shown in FIG. 9. In FIG. 20A, items indicated by reference numerals 901-907 are identical to the same parts shown in FIG. 9. However, in addition to these, an upload button 2001 is included in FIG. 20A.

In addition, in FIG. 19, the HTML document displayed in step S802 is shown in FIGS. 20A and 20B and a procedure for uploading is included between step S802 and step S803, and it is these two points that are different from FIG. 8. Accordingly, a description of those portions that are the same as those in FIG. 8 is omitted.

When the screens shown in FIGS. 20A-B are displayed in step S802, it is determined in a step S1901 whether or not an upload has been performed. An upload is as follows. When the upload button 2001 is pressed, a pop-up window 2010 shown in FIG. 20B is displayed. This may be described in the HTML document. After a file name 2011 to be uploaded has already been written in, an OK button 2013 is pressed and the file uploaded. It should be noted that a cancel button 2013 can erase the pressing of the upload button 2001. Moreover, pressing a search button 2014 displays the file system at that client terminal, enabling the operator to select therefrom the desired file or files for uploading.

When it is determined in step S1901 that an upload has been performed, in a step S1902 the specified file (that is, the file having the file name designated by the file name 2011) is transmitted to the server 608 from the client by FTP or the like. At this time, in addition to the file, if that file contains a character object, then the font used therein may also be uploaded, because the fonts installed in the client that produced the file are not always installed in the server. The server, having received the file, stores the received file in the data storage unit 610 together with the application data file provided to the client. In addition, if the font is received simultaneously with the file, and if that font is not installed in the server, then that font is registered in the system resource database as a new font.

The remainder is the same as the first and third embodiments. By such a configuration, the document processing system of the present embodiment can distribute via the server a document uploaded from the client, achieving the same effects as the first and third embodiments.

Fifth Embodiment

Figure 21:
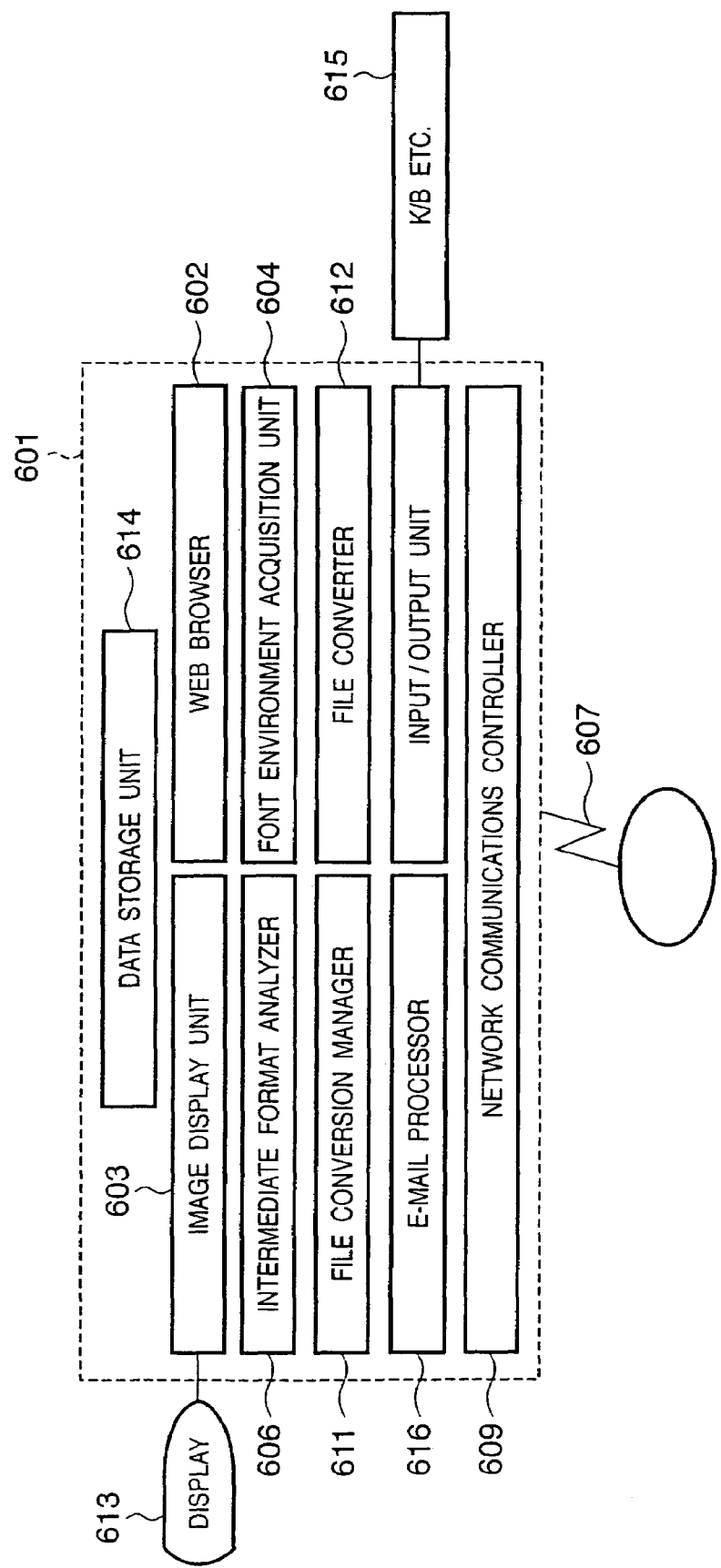
FIG. 21 is a software block diagram for an e-mail terminal according to a fifth embodiment of the present invention.

As a fifth embodiment of the present invention, an embodiment is shown that converts a file attached to an e-mail at transmission into an intermediate file. FIG. 21 is a block diagram of an e-mail terminal, in which components that are the same as those shown in FIG. 5 are given the same reference numerals. The terminal, in addition to the client configuration, is equipped with a file converter and a file conversion manager. Furthermore, as a unique configurational element of the present embodiment, the terminal has a client 601 e-mail processor 616. The e-mail processor 616 corresponds to a user agent (UA) in a message handling system and is electronic mail client software. However, it differs from ordinary e-mail software insofar as it can perform the processes shown in FIG. 23 to be described later. The rest of the configuration is the same as the configurational elements of the client 601 and the server 608 of the first embodiment, and therefore a description of individual elements is omitted. A description is now given of the outlines of the processes performed in the present embodiment in a system such as this.

(0) The e-mail processor is activated.
(1) The operator specifies the e-mail address.
(2) The operator inputs the text of the e-mail.
(3) The presence or absence of an attached file is determined, and if an attached file is present, the user specifies from the UI whether or not to put the file into PDF.
(4) When the operator issues an instruction to transmit, the country or region of the addressee is identified from the domain name of the address.
(5) The Language ID is acquired from the destination database using the identified country or region.
(6) The attached file font Language ID is acquired.
(7) The attached file is converted into an intermediate file. At this time, if the font Language ID and the address Language ID do not match, font form information of the font used in the attached document is embedded in the intermediate file.
(8) The electronic mail is transmitted.

FIG. 22 shows an example of a destination database of the present embodiment. FIG. 22 uses a configuration in which (4) and (5) described above are carried out simultaneously. Of course, these may be separate tables. In FIG. 22, the top-level domain name and the corresponding Language ID are registered in the destination database 2201. For example, if the top-level domain name is jp, then, since the address is the domain of Japan, the corresponding Language ID is 1041.

Figure 23:
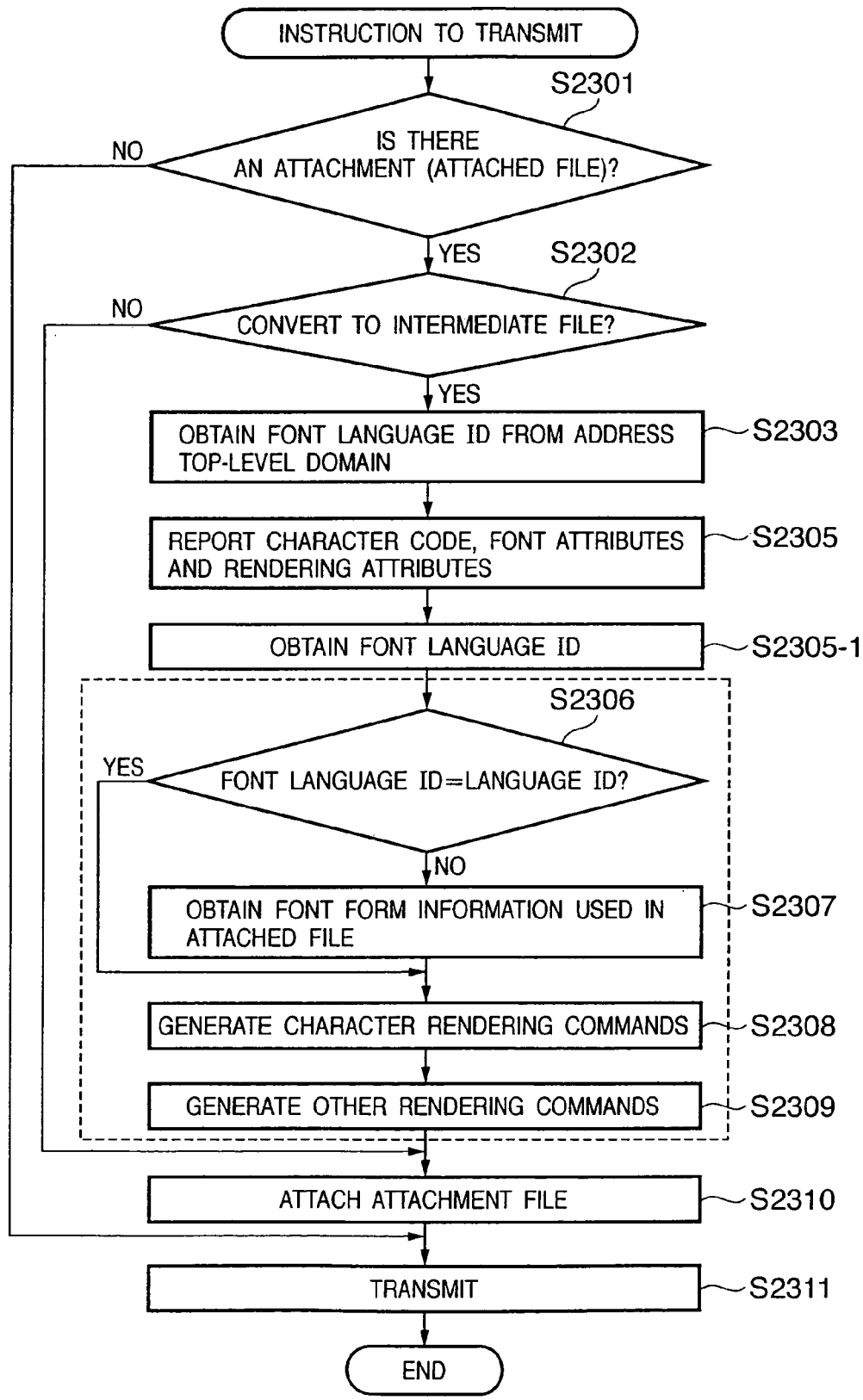
FIG. 23 is a flow chart illustrating the process of an attached file conversion by the e-mail terminal in the fifth embodiment of the present invention.

FIG. 23 shows a processing procedure performed by the e-mail processor 6161 when an instruction to transmit an e-mail is received. However, it should be noted that the processing procedure includes processes performed by the printer driver. In FIG. 23, first, a determination is made as to whether or not an attached file is present (S2301). If there is an attached file, then a determination is made as to whether or not there is an instruction to convert that file into an intermediate file (S2302). This instruction is carried out from the UI at the time the e-mail processor e-mail is created. Next, of the specified address domains, the top-level domain name is searched from the database shown in FIG. 22 and the corresponding Language ID (this is called the e-mail Language ID) is obtained. The e-mail Language ID thus obtained is then stored at a location of predetermined address in the memory (S2303).

Thereafter, a request is issued from the e-mail processor 616 to the file converter 612 to convert the attached file into an intermediate file. The file converter 612 activates the application 612-1 and carries out step S2305. The application 612-1 reports the character code, font attributes and rendering attributes of the character objects used in the attached file to the printer driver (S2305). Step S2306 to step S2309 are then performed by the printer driver receiving such a report. The printer driver queries the graphic engine for the font Language ID based on the font face name included in the font attributes accepted as a GDI function parameter. If, for example, the font Language ID is a TrueType (registered trademark) font, then the font Language ID is stored in the name table in the TrueType (registered trademark) font table. In terms of Windows (registered trademark), there is a TrueType (registered trademark) font in the font table, which is a table that can be utilized in Windows (registered trademark), and which can be checked in order to obtain the font Language ID (S2305-1).

Next, the e-mail Language ID stored at the predetermined address and the font Language ID are compared. If they do not match, then the font form information used in the attached file is obtained from the operating system (S2307). Then, character rendering commands in which the font form is embedded, that is, an intermediate file, is created (S2308). In addition, other rendering commands for objects other than characters are created (S2309).

When an attached file is thus converted into an intermediate file, the e-mail processor 616 carries out an encoding process of attaching the attached file to the e-mail (S2310) and transmitting it to the network (S2311).

If in step S2306 it is determined that the e-mail Language ID and the font Language ID do match, then the attached file is converted into an intermediate file without embedding the font form information. In addition, if it is determined in step S2302 that an intermediate file is not necessary, then the attached file is attached as is as an application data file. If it is determined in step S2301 that there is no attached file, then the e-mail is transmitted without attachment.

It should be noted that, if the top-level domain name of the address is not registered in the database in step S2303, for example, if the top-level domain name is not the name of a country, such as net or com, then the user inputs the e-mail Language ID via the UI.

According to the e-mail terminal of the present embodiment as described above, when converting a file attached to a piece of electronic mail to an intermediate file, an increase in the size of the attached file beyond what is necessary in order to determine whether or not font form information suited to the address domain name is embedded in the attached file can be prevented. In addition, the contents of the attached file can be securely reproduced at the address terminal (computer). Moreover, it is not necessary for the operator to ascertain whether or not font form information is embedded in the file, and thus the operability for the operator can be improved. In addition, mistaken embedding of a font or failure to embed a font can be prevented.

First Variation on the Fifth Embodiment

The process of determining whether or not a font has been embedded can be also be further simplified. FIG. 24 shows a procedure for doing so. Steps S2401-S2404 shown in FIG. 24 are substituted for steps S2301-S2306 in FIG. 23.

Step S2401 and step S2402 are the same as steps S230-1 and S2302, respectively. In a step S2403, the sender's top-level domain name and the recipient's top-level domain name are compared. If the two names do not match, then the character code, font attributes and rendering attributes are reported to the graphic engine.

As described above, by directly comparing the domain names, the process of determining font embedding at the e-mail terminal of the fifth embodiment can be simplified. In this embodiment, if the sender's top-level domain and the recipient's top-level domain match, an intermediate file is generated in which all fonts are not embedded. Conversely, if the two top-level domains do not match, then an intermediate file is generated in which all fonts are embedded.

Second Variation on the Fifth Embodiment

Although in the present embodiment processes are performed with a single terminal, the embodiment can also be configured as a server-client system like the first embodiment. In that case, the client registers the Language ID corresponding to the country identified from the recipient's domain name in the client request table 1101 and transmits it to the server. The server processes in generally the same way as in the first embodiment and returns the intermediate file to the client. The client then transmits electronic mail with the intermediate file as an attached file.

Thus, as described above, in a client-server system as well, the size of the attached file can be restricted to the maximum size necessary while maintaining the readability of the attached file. It should be noted that the present variation can also be combined with the first variation of the fifth embodiment described above.

It should be noted that, although the embodiments described above are described with reference to the division of roles among the application, the graphic engine and the printer driver, in actuality the division of roles is not limited to that described in these embodiment. In other words, because the embodiments are premised on an existing operating system, the division of roles is fixed. However, it is logically possible for the processing procedures that the printer driver carries out in the embodiments to be performed by the graphic engine, or vice-versa.

In addition, although the first through fourth embodiments are server-client systems, a document processing system can also be compromised of a single computer. In that case, one computer is both the client 601 and the server 608 shown in FIG. 5.

Note that the present invention can be applied to an apparatus comprising a single device or to a system constituted by a plurality of devices.

Furthermore, the invention can be implemented by supplying a software program, which implements the functions of the foregoing embodiments, directly or indirectly, to a system or apparatus, reading the supplied program code with a computer of the system or apparatus, and then executing the program code. In this case, so long as the sister or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by a interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a nonvolatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied b dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-148302 filed May 18, 2004, which is hereby incorporated by reference herein.

What is claimed is:

1. A document generation apparatus that generates document data with a font that can include a character font based on original document data, comprising:
    a comparator that compares a type of language of the original document data and a terminal language type of provided at a reproduction terminal that reproduces the original document data; and
    a generator that generates document data with a font based on the original document data that does not include a character font when results of the comparison performed by the comparator indicate that both types of languages match, and generates document data with a font based on the original document data that does include a character font used in the original document data when the results of the comparison performed by the comparator indicate that both types of language do not match,
    wherein the document data is attachment data to be attached to an e-mail, and
    if a top level domain of a recipient's domain name of the e-mail is a country code, said comparator employs a type of language corresponding to the country code as the terminal language type, and
    if the top level domain of the recipient's domain name of the e-mail is not a country code, said comparator employs a type of language input by a user as the terminal language type.

2. The document generation apparatus according to claim 1, further comprising a communications unit for connection to a terminal,
    wherein the comparator uses the language of the original document data as the language of the document generation apparatus and uses a type of language specified by language identification information received from the reproduction terminal through the communications unit as the type of language provided at the reproduction terminal.

3. The document generation apparatus according to claim 2, further comprising an uploader that receives and saves the original document data and language identification information indicating the type of language provided at a terminal that created the original document data from a terminal connected by the communications unit,
    wherein the comparator performs the comparison using the type of language provided by the language identification information saved by the uploader instead of the type of language of the document generation apparatus as the type of language of the original document data when the original document data is original document data saved by the uploader.

4. The document generation apparatus according to claim 1, wherein the comparator further uses the type of language corresponding to the country code as the type of language of the original document data when the top level domain of a sender domain name of the e-mail is a country code.

5. The document generation apparatus according to claim 1, wherein the comparator uses the type of font provided at the terminal that created the original document data as the type of language of the original document data, and uses the type of font provided at the reproduction terminal as the type of language provided at the reproduction terminal that reproduces the original document data.

6. A document generation method that generates document data with a font that can include a character font based on original document data, the method comprising:
    an acquisition and storage step of acquiring and storing in a memory first language identification information indicating a language of the original document data;
    a storage step of acquiring and storing in a memory second language identification information indicating a terminal language type provided at a reproduction terminal that reproduces the original document data;
    a comparison step of comparing the first language identification information and the second language identification information stored in the memory; and
    a generating step of generating and saving document data with a font that does not include a character font based on the original document data if results of the comparison performed in the comparison step indicate that the first and second language identification information do match, and generating and saving document data with a font that does include a character font based on the original document data if the results of the comparison performed in the comparison step indicate that the first and second language identification information do not match,
    wherein the document data is attachment data to be attached to an e-mail, and
    if a top level domain of a recipient's domain name of the e-mail is a country code, said comparison step employs a type of language corresponding to the country code as the second identification information indicating the terminal language type, and
    if the top level domain of the recipient's domain name of the e-mail is not a country code, said comparison step employs a type of language input by a user as the second identification information indicating the terminal language type.

7. A computer-readable storage medium storing a computer program for causing a computer to execute the method according to claim 6.

* * * * *